(12) United States Patent
Hosonuma et al.

(10) Patent No.: US 12,031,632 B2
(45) Date of Patent: Jul. 9, 2024

(54) SEAL STRUCTURE

(71) Applicant: EAGLE INDUSTRY CO., LTD., Tokyo (JP)

(72) Inventors: Norimasa Hosonuma, Fujisawa (JP); Yoshiaki Takigahira, Tokyo (JP); Takuto Fukuhara, Tokyo (JP); Kosei Hashimoto, Fujisawa (JP); Nozomu Suzuki, Fujisawa (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

(21) Appl. No.: 17/911,164

(22) PCT Filed: Mar. 26, 2021

(86) PCT No.: PCT/JP2021/012995
§ 371 (c)(1),
(2) Date: Sep. 13, 2022

(87) PCT Pub. No.: WO2021/200696
PCT Pub. Date: Oct. 7, 2021

(65) Prior Publication Data
US 2023/0160473 A1    May 25, 2023

(30) Foreign Application Priority Data

Mar. 31, 2020 (JP) ................................. 2020-065182

(51) Int. Cl.
*F16J 15/3268* (2016.01)
*F16J 15/3284* (2016.01)

(52) U.S. Cl.
CPC ....... *F16J 15/3268* (2013.01); *F16J 15/3284* (2013.01)

(58) Field of Classification Search
CPC ...... F16J 15/3268; F16J 15/3284; F16J 15/34; F16J 15/3436; F16J 15/344; F16J 15/3464; F16J 15/3496
See application file for complete search history.

(56) References Cited

U.S. PATENT DOCUMENTS 5,165,699 A    11/1992  Shrontz et al.
5,558,341 A *  9/1996  McNickle ............ F16J 15/3488
                                              277/400

(Continued)

FOREIGN PATENT DOCUMENTS

EP          0881416 A1     12/1998
JP          S59-058253 U    4/1984

(Continued)

OTHER PUBLICATIONS

Notice of Reasons for Refusal issued in corresponding Japanese Patent Application No. 2022-512138 dated Aug. 15, 2023, with English translation (6 Pages).

(Continued)

*Primary Examiner* — Gilbert Y Lee
(74) *Attorney, Agent, or Firm* — Harness, Dickey & Pierce, P.L.C.

(57) ABSTRACT

The seal structure includes a shaft member, a bush having a shaft hole for passing the shaft member, a pressure-receiving member having a facing surface facing an end surface of the bush on one side in the direction of the axis, and an elastic member that presses the bush against the pressure-receiving member from another side in the direction of the axis, in which a first coating layer is formed between an outer peripheral surface of the shaft member and an inner peripheral surface of the shaft hole of the bush, and a second coating layer is formed between the end surface of the bush (Continued)

on one side in the direction of the axis and the facing surface of the pressure-receiving member.

15 Claims, 9 Drawing Sheets

(56) References Cited

U.S. PATENT DOCUMENTS

| | | | |
|---|---|---|---|
| 2014/0117627 A1 | 5/2014 | Franke | |
| 2014/0265145 A1* | 9/2014 | Copeland, III | F02C 7/28 277/358 |
| 2015/0167846 A1* | 6/2015 | Haynes | F16J 15/442 277/350 |
| 2019/0063610 A1 | 2/2019 | Komatsu et al. | |
| 2020/0056701 A1 | 2/2020 | Hosonuma et al. | |
| 2020/0181309 A1 | 6/2020 | Tadokoro et al. | |
| 2020/0370651 A1* | 11/2020 | Swift | F16J 15/30 |

FOREIGN PATENT DOCUMENTS

| | | |
|---|---|---|
| JP | S61-075556 U | 5/1986 |
| JP | 2002-022026 A | 1/2002 |
| JP | 2009-059659 A | 3/2009 |
| JP | 2010-218984 A | 9/2010 |
| JP | 2014-514517 A | 6/2014 |
| JP | 2014-169787 A | 9/2014 |
| JP | 2016-108476 A | 6/2016 |
| JP | 2017-007381 A | 1/2017 |
| KR | 101747045 B1 | 6/2017 |
| WO | 2018-198876 A1 | 11/2018 |
| WO | 2018-199181 A1 | 11/2018 |

OTHER PUBLICATIONS

International Search Report for corresponding International Application No. PCT/JP2021/012995 dated May 18, 2021, with English translation (6 Pages).
Arita, T. et al., "High-pressure atom transfer radical polymerization of methyl methacrylate for well-defined ultra high molecular-weight polymers," Polymer, 49, 2008, 2426-2429, Abstract (1 page).
Written Opinion for corresponding International Application No. PCT/JP2021/012995 dated May 18, 2021, with English translation (6 Pages).
International Preliminary Report on Patentability for corresponding International Application No. PCT/JP2021-012995 dated May 18, 2021, with English translation (7 Pages).
Extended European Search Report issued in corresponding Application No. 21779166.4 dated Mar. 13, 2024 (8 Pages).
Notice of Reasons for Refusal issued in corresponding Japanese Patent Application No. 2022-512138 dated Feb. 19, 2024, with English translation (6 Pages).

* cited by examiner

SEAL STRUCTURE

CROSS REFERENCE TO RELATED APPLICATIONS

The present application is a national stage application of International Patent Application No. PCT/JP2021/012995 filed on Mar. 26, 2021, which claims the benefit of Japanese Patent Application No. 2020-065182, filed on Mar. 31, 2020. The contents of these applications are incorporated herein by reference in their entirety.

BACKGROUND

Technical Field

The present disclosure relates to a seal structure.

Description of the Related Art

Seal structures have a function of preventing leakage of a liquid or a gas from the inside of a machine or the like to the outside, and a function of preventing the intrusion of dust and the like into the inside of the machine or the like from the outside. Such seal structures can be roughly divided into dynamic seals such as oil seals and mechanical seals, and static seals (i.e., fixing seals) such as gaskets.

A dynamic seal needs to serve both the sealing and lubrication functions on a sliding surface. As a technique that can achieve both excellent sealing performance and excellent lubricity on a sliding surface, a technique described in International Publication No. WO 2018/198876 is known. International Publication No. WO 2018/198876 describes that a sliding surface of a mechanical seal is provided with a polymer brush layer so that when a sliding member is rotated at the boundary between different environments, such as environments of different pressures or environments of different gases, on the opposite sides of the seal, it is possible to improve the sealing performance and achieve low frictional properties at the boundary or in a mixed lubrication region.

However, in the seal structure described in International Publication No. WO 2018/198876, as illustrated in FIG. 2 thereof, for example, when the sliding member rotates in a sealed state under environments of different pressures, a plane to which a load is applied due to the pressure difference is parallel with the rubbing surface (i.e., a contact surface between a mating ring 24 (i.e., a seal member 1) and a seal ring 25 (i.e., a seal member 2)) during the rotation, and thus, the applied load acts directly on the rubbing surface. Therefore, since a load (i.e., a contact load) is continuously applied to the polymer brush layer, there is concern that the wear of the polymer brush layer may proceed. The wear of the polymer brush layer proceeds significantly when the sliding member rotates in a sealed state under environments of different pressures. In addition, such wear is also seen when the sliding member rotates in a sealed state under environments of different gases. If the polymer brush layer wears, it will become unable to achieve the effects of improving the sealing performance and providing low frictional properties.

Meanwhile, International Publication No. WO 2018/199181 describes, as illustrated in FIGS. 1 and 2 thereof, a technique for achieving the effects of improving the sealing performance and providing low frictional properties with a rubbing surface by forming a polymer brush layer on the outer peripheral surface of a shaft (i.e., a shaft member, a rod specimen 3) that rubs on the inner peripheral surface of a shaft hole of a bush (i.e., a ring specimen 2). International Publication No. WO 2018/199181 describes that the seal structure described therein can achieve the effects of improving the sealing performance and providing low frictional properties when the outer peripheral surface of the shaft slides on the inner peripheral surface of the shaft hole of the bush in a reciprocating manner. At this time, a plane on which the polymer brush layer is formed is parallel with the direction in which the shaft slides on the bush in a reciprocating manner. Thus, there is no possibility that a load (i.e., a contact load) in a perpendicular direction or the like will be continuously applied to the polymer brush layer.

However, International Publication No. WO 2018/199181 fails to describe that the shaft rotates with respect to the bush. Thus, when the seal structure described in International Publication No. WO 2018/199181 is applied to a configuration in which the shaft rotates with respect to the bush, there is concern that if the shaft becomes eccentric with respect to the bush, the sealing performance may degrade or wear may proceed due to an increase in friction.

Since each of the aforementioned two related techniques is applicable only to a movement pattern in which a shaft rotates or reciprocates, it would be difficult to achieve the effects of satisfactorily improving the sealing performance and providing low frictional properties for a long term for a seal of a structure in which a shaft rotates and reciprocates at the same time (e.g., a vacuum seal of a semiconductor manufacturing apparatus).

It should be noted that even for the movement pattern in which a shaft only rotates without reciprocating or a shaft only reciprocates without rotating, it is desired to achieve even greater effects of excellently improving the sealing performance and providing low frictional properties.

SUMMARY

The present disclosure relates to the aforementioned problems.

A seal structure of one aspect of the present disclosure is a seal structure for sealing a gap between an opening provided in a housing and a shaft member inserted through the opening, including a tubular bush provided between the shaft member and the housing and arranged around the shaft member, the tubular bush being relatively movable with respect to the shaft member in an axial direction and/or a circumferential direction; a pressure-receiving member having a facing surface facing an end surface of the bush on one side in the axial direction; and an elastic member that presses the bush against the pressure-receiving member from another side in the axial direction, in which a first coating layer is provided between an outer peripheral surface of the shaft member and an inner peripheral surface of the shaft hole in the bush, and a second coating layer is formed between the end surface of the bush on the one side in the axial direction and the facing surface of the pressure-receiving member.

In one aspect of the present disclosure, the first coating layer and the second coating layer may be swollen with a liquid substance.

An inner surface region of the housing surrounding the opening may form the facing surface of the pressure-receiving member.

Alternatively, a flat ring member may be provided between an inner surface region of the housing surrounding the opening and the end surface of the bush on the one side in the axial direction, and the ring member may form the pressure-receiving member.

When the ring member forms the pressure-receiving member, an elastic member for the ring member may be further provided between the inner surface region of the housing and the ring member, and the elastic member for the ring member may press the ring member against the bush from the one side in the axial direction.

In the seal structure of one aspect of the present disclosure, the elastic member may be provided between an inner surface region of the housing surrounding, of the opening, the opening on the other side in the axial direction and an end surface of the bush on the other side in the axial direction. In such a case, one end side of the elastic member along a direction of expansion and contraction may be connected to the bush, and another end side of the elastic member may be connected to an inner surface of the housing.

A plurality of seal units may be arranged in parallel along an axial direction, the seal units each having the aforementioned seal structure of the present disclosure and sharing the housing for a shaft member. Orientations of at least one pair of adjacent seal units among the plurality of seal units may be inverted with respect to each other in the axial direction. In such a case, as another aspect of the present disclosure, a seal structure may be exemplarily illustrated in which the housing has a pair of through-holes at opposite positions along the axial direction, the pair of through-holes being adapted to pass the shaft member, the number of the seal units is two, and one of the through-holes corresponds to an opening of one of the pair of seal units, and another through-hole corresponds to an opening of another seal unit.

In such a case, the housing may include a protruding portion protruding from an inner peripheral surface of the housing toward the shaft member at a center of the housing along the axial direction, and in each of the two seal units, the elastic member may be provided between a surface of the protruding portion on a side of the seal structure and an end surface of the bush facing the protruding portion.

In each of the two seal units, one end side of the elastic member along the direction of expansion and contraction may be connected to the bush, and another end side of the elastic member may be connected to the protruding portion.

Orientations of at least one pair of adjacent seal units among the plurality of seal units may be the same along the axial direction.

In addition, another seal unit may be provided adjacent to one side of one of the plurality of seal units along the axial direction.

Further, an internal space of the housing may be filled with a liquid substance that swells the first coating layer and the second coating layer in each of the two seal units.

According to one aspect of the present disclosure, a seal structure can be provided that can achieve the effects of excellently improving the sealing performance and providing low frictional properties for a gap between a shaft member and a bush.

DETAILED DESCRIPTION

A seal structure and a seal structural body according to an embodiment as an exemplary aspect of the present disclosure will be described with reference to the drawings.

Hereinafter, for convenience's sake of description, the direction of an arrow (a) along the direction of the axis x (see FIGS. 1 and 3 to 5) shall be assumed as the upper side (a), and the direction of an arrow (b) along the direction of the axis x (see FIGS. 1 and 3 to 5) shall be assumed as the lower side (b).

First Embodiment

Figure 1:
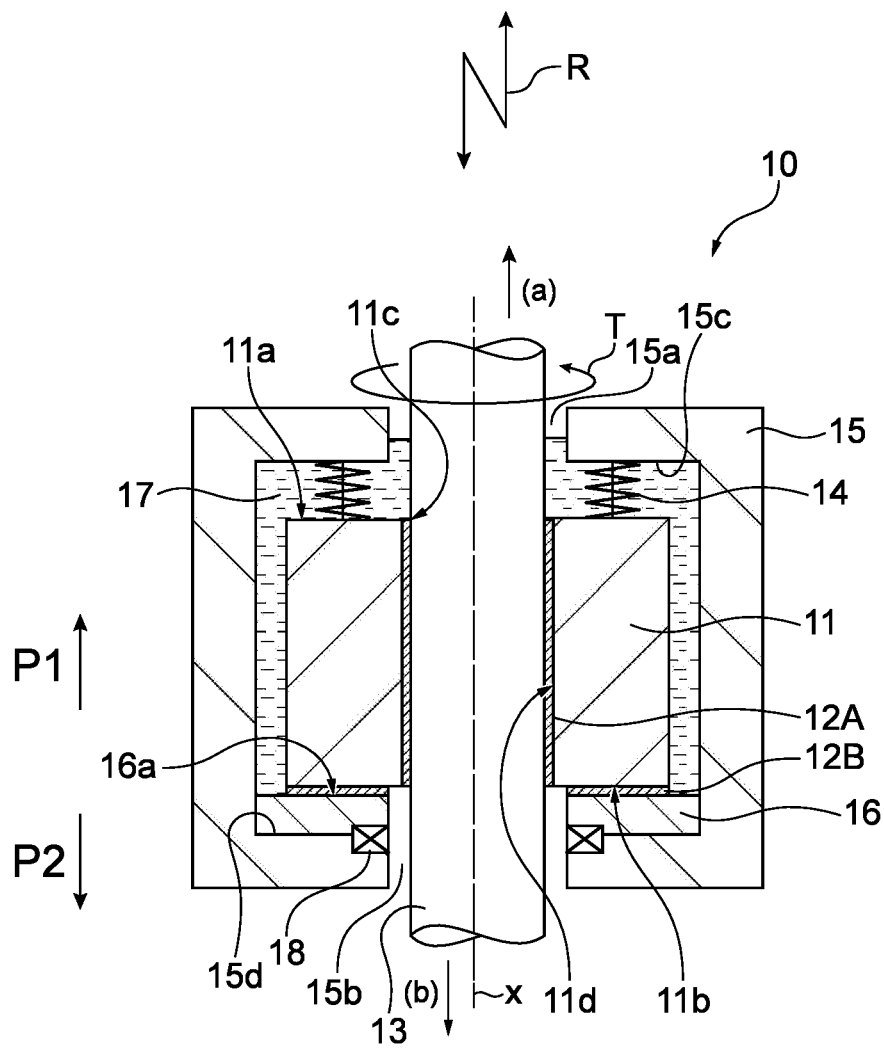
FIG. 1 is a cross-sectional view of a cross-section along an axis for illustrating the schematic configuration of a seal structure according to a first embodiment as an exemplary aspect of the present disclosure.

FIG. 1 is a cross-sectional view of a cross-section along the axis x for illustrating the schematic configuration of a seal structure 10 according to a first embodiment as an exemplary aspect of the present disclosure. The configuration of the seal structure 10 according to the present embodiment will be described with reference to FIG. 1.

The seal structure 10 according to the present embodiment is a seal structure for sealing an annular gap between a shaft 13, which is a rotary shaft member, and a shaft hole 11c of a cylindrical bush 11 through which the shaft 13 is adapted to be fitted and inserted. The seal structure 10 is used to seal the gap between the shaft member and the shaft hole that is formed in the bush, a housing, or the like and through which the shaft member is adapted to be inserted in a semiconductor manufacturing apparatus, a general-purpose machine, or a vehicle, for example. It should be noted that the target of application of the seal structure 10 according to the embodiment of the present disclosure is not particularly limited.

As illustrated in FIG. 1, the seal structure 10 according to the present embodiment includes the rotary shaft 13, the bush 11, a flat ring member (i.e., a pressure-receiving member) 16, springs (i.e., elastic members) 14, a housing 15, and a seal ring 18.

The housing 15 has openings 15a and 15b, which are adapted to pass the shaft 13, in its opposite end surfaces along the direction of the axis x, and houses therein the bush 11, the elastic members 14, and the ring member 16.

The bush 11 has the shape of a thick-walled cylinder with a shaft hole 11c through which the shaft 13 is adapted to be fitted and inserted, and has flat ring-shaped end surfaces 11a and 11b on its opposite sides (i.e., the upper side (a) and the lower side (b)) along the direction of the axis x.

The shaft 13 is adapted to rotate counterclockwise (i.e., in the direction of an arrow T) and also move up and down between the upper side (a) and the lower side (b) in the direction of the axis x (indicated by an arrow R) as illustrated in FIG. 1. That is, rotational sliding caused by a counterclockwise rotation (i.e., in the direction of the arrow T) as well as reciprocating sliding in the direction of the axis x occur between an outer peripheral surface of the shaft 13 and an inner peripheral surface 11d of the shaft hole 11c of the bush 11.

The ring member 16 is provided between an inner surface region 15d of the housing 15 surrounding, of the openings 15a and 15b of the housing 15, the opening 15b on one side (i.e., the lower side (b)) in the direction of the axis x and an end surface 11b of the bush 11 on one side (i.e., the lower side (b)) in the direction of the axis x. In addition, the ring member 16 has a facing surface 16a facing the end surface 11b of the bush 11 on one side (i.e., the lower side (b)) in the direction of the axis x.

The inner peripheral surface 11d of the shaft hole 11c of the bush 11 has a first coating layer 12A formed thereon. The first coating layer 12A fills a gap between the inner peripheral surface 11d of the shaft hole 11c and the outer peripheral surface of the shaft 13.

In addition, the facing surface 16a of the ring member 16 has a second coating layer 12B formed thereon.

The springs 14 are provided between an inner surface region 15c of the housing 15 surrounding, of the openings 15a and 15b of the housing 15, the opening 15a on the other side (i.e., the upper side (a)) in the direction of the axis x and an end surface 11a of the bush 11 on the other side (i.e., the upper side (a)) in the direction of the axis x. The springs 14 press the bush 11 against the ring member 16 from the other side (i.e., the upper side (a)) in the direction of the axis x. Thus, the end surface 11b of the bush 11 is pressed against the facing surface 16a of the ring member 16 having the second coating layer 12B formed thereon due to the elastic action (i.e., the restoring action in the extension direction) of the springs 14.

Further, one end side (i.e., the lower side (b)) of each spring 14 along its direction of expansion and contraction (which is the same as the direction of the axis x) is connected to the bush 11, and the other end side (i.e., the upper side (a)) of each spring 14 is connected to the inner surface (i.e., the inner surface region 15c) of the housing 15. Although FIG. 1 schematically illustrates a pair of right and left springs 14, three springs are, in practice, arranged at equiangular (or rotationally symmetric) positions (that is, at positions of a circumference angle of 120°) along the circumferential direction of the annular end surface 11a of the bush 11 as seen from the other end side (i.e., the upper side (a)) in the direction of the axis x (see FIG. 9 described later).

The internal space of the housing 15 is filled with a swelling liquid (i.e., a liquid substance) 17. The internal space of the housing 15 is sealed except the opening 15a, and the swelling liquid 17 stays in the internal space.

The swelling liquid 17 is in contact with the first coating layer 12A and the second coating layer 12B. The swelling liquid 17 is a liquid with a property of swelling the first coating layer 12A and the second coating layer 12B, and an ionic liquid is used, for example. The details of the swelling liquid 17 will be described later.

As illustrated in FIG. 1, an edge of the opening 15b of the housing 15 on the side of the ring member 16 (i.e., the upper side (a)) is provided with a step portion. In addition, an edge of the central hole of the ring member 16 on the side of the housing 15 (i.e., the lower side (b)) is also provided with a step portion with the same shape. The seal ring 18 is arranged so as to be housed within the two step portions.

In the seal structure 10 according to the present embodiment, the upper portion in FIG. 1 is at a predetermined pressure P1, and the lower portion is at a predetermined pressure P2. The seal structure 10 seals the boundary between the two pressures. For example, when the seal structure 10 according to the present embodiment is applied to a vacuum seal of a semiconductor manufacturing apparatus, P1 is the atmospheric pressure AP and P2 is the vacuum pressure V, and the seal structure 10 isolates the different pressures from each other.

It should be noted that in the seal structure 10 of the present embodiment, the predetermined pressures P1 and P2 are not limited to different pressures like the atmospheric pressure AP and the vacuum pressure V, and the seal structure 10 can be suitably applied to a seal under environments of different pressures having other pressure relationships. Further, the seal structure 10 of the present embodiment can be suitably applied to a seal at the boundary between different environments, such as environments of different gases, regardless of whether or not the predetermined pressures P1 and P2 are different pressures (hereinafter, the same is true of the predetermined pressures P1 and P2 in the other embodiments).

The swelling liquid 17 that has entered the contact surface between an inner peripheral surface 15e of the housing 15 and the outer periphery of the ring member 16 reaches the contact surface between the inner surface region 15d of the housing 15 and a rear surface 16b of the ring member 16, but is blocked and sealed by the seal ring 18. As the seal ring 18, a common O-ring can be used as appropriate as long as it is resistant to the swelling liquid 17.

The first coating layer 12A and the second coating layer 12B are the same coating layers.

In this specification, the term "coating layer" simply refers to the first coating layer 12A or the second coating layer 12B without distinction, and may be assigned a reference sign "12." In addition, in this specification, a region around a surface on which the coating layer 12 is formed may be referred to as a "seal member," and in such a case, a reference sign "1" is assigned thereto.

Hereinafter, coating layers that can form the first coating layer 12A and the second coating layer 12B will be described.

Examples of the applicable coating layers include coating layers made of conventionally known various organic thin films or inorganic thin films.

Examples of inorganic materials applicable to the coating layers include chromium nitride (CrN, $Cr_2N$), chromium carbide ($Cr_3C_2$), hard chromium plating, diamond-like carbon (DLC), diamond, titanium nitride (TiN), titanium carbide (TiC), titanium carbonitride (TiCN), titanium aluminum nitride (TiAlN), alumina, alumite (Al$_2$O$_3$), silicon carbide (SiC), graphite (C), and carbon black.

Examples of organic materials applicable to the coating layers include polybutadiene, polyurethane, polyisocyanate, acrylic resin, and silicone resin (in this specification, silicone resin is regarded as a type of organic materials).

The thickness of each coating layer made of an inorganic thin film or an organic thin film differs depending on the thickness suitable for each of various thin films or a thickness that is possible, and it is acceptable as long as the thickness is appropriately adjusted according to each material or various other conditions.

Among such inorganic thin films or organic thin films, the thin film is preferably a thin film in a swollen state, or more preferably, an organic thin film in a swollen state.

In the present disclosure, a polymer brush layer is particularly preferably used as each of the coating layers that can form the first coating layer 12A and the second coating layer 12B.

Described hereinafter is an example of the seal member 1 in which a polymer brush layer is used as each coating layer 12.

Figure 2:
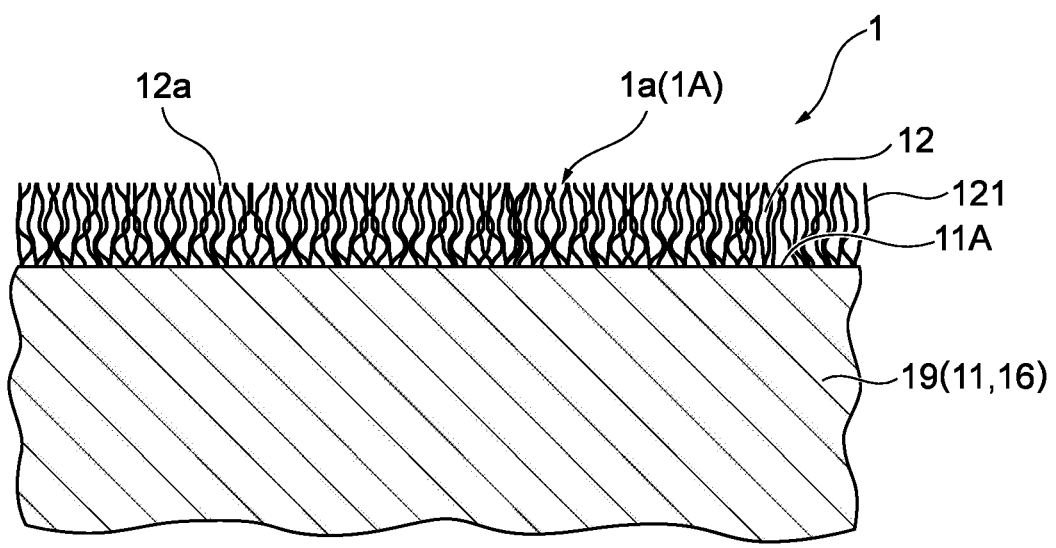
FIG. 2 is a partially enlarged schematic cross-sectional view of a cross-section of a polymer brush layer and a substrate (i.e., a bush and a ring member).

FIG. 2 illustrates a partially enlarged schematic cross-sectional view of a cross-section of the coating layer 12 (hereinafter, a polymer brush layer formed as the coating layer 12 may be particularly expressed as the "polymer brush layer 12") and the substrate (i.e., the bush 11 and the ring member 16; hereinafter, the two shall be collectively referred to as the "substrate" and will be described with a reference sign "19" assigned thereto). As illustrated in FIG. 2, the seal member 1 has a seal surface 1a as its surface 1A.

Herein, the seal surface 1a is at least a part of the surface 1A of the seal member 1, and faces the outer peripheral surface of the shaft 13 or the end surface 11b of the bush 11 (hereinafter collectively referred to as a "surface to be sealed"). The seal surface 1a means a surface capable of forming a sealed state between the seal surface 1a and the surface to be sealed. In addition, the seal member 1 includes the substrate 19 and the polymer brush layer 12 formed on the surface 11A of the substrate 19 as illustrated in FIG. 2.

The formation state of the polymer brush layer 12 is not particularly limited, and may be appropriately selected according to the shape, material, and surface texture of the substrate 19 and the usage pattern of the seal member 1, for example.

For example, the polymer brush layer 12 may be formed directly or indirectly on a substrate surface 11A.

A case where the polymer brush layer 12 is formed indirectly on the substrate surface 11A is, for example, a configuration in which surface treatment is applied to the substrate 19 to form another layer on the substrate surface 11A, and the polymer brush layer 12 is formed on the surface of the other layer. Herein, examples of the other layer include a silica coat layer described below.

The polymer brush layer 12 need not necessarily cover the entire substrate surface 11A completely. The seal member 1 may have a portion in which the polymer brush layer 12 is not formed on the substrate surface 11A within the range that the effects of the present disclosure are not hindered, or the polymer brush layers 12 having a given area may be scattered on the substrate surface 11A. It should be noted that even when the coating layer 12 is a layer other than a polymer brush layer, the coating layer 12 need not still completely cover the entire substrate surface 11A.

Further, in the seal member 1, the polymer brush layer 12 may be formed beyond the substrate surface 11A, for example, so as to cover the entire substrate 19. That is, as long as the seal member 1 has the polymer brush layer 12 on the substrate surface 11A, the seal surface 1a exhibits excellent sealing performance. Even when the coating layer 12 is a layer other than a polymer brush layer, the coating layer 12 may be similarly formed beyond the substrate surface 11A.

From the viewpoint of obtaining higher sealing performance with the seal surface 1a, the polymer brush layer 12 is preferably formed on the entire substrate surface 11A. In such a case, the seal surface 1a corresponds to a surface 12a of the polymer brush layer 12.

The polymer brush layer 12 is a layer obtained by covalently immobilizing a plurality of polymer graft chains 121 on the substrate surface 11A as illustrated in FIG. 2. The surface 12a of such a polymer brush layer 12 is a surface in which the tips of the polymer graft chains 121 on the side not immobilized on the substrate 19 thicken in a brush form, and has a surface texture like the surface of a brush.

In the seal member 1 having such a polymer brush layer 12 as the seal surface 1a, the surface texture (in particular, the surface roughness) of the substrate surface 11A corresponding to the seal surface 1a is eased by the polymer brush layer 12, whereby the surface texture hardly influences the flatness of the seal surface 1a. This makes it unnecessary to subject the substrate surface 11A corresponding to the seal surface 1a to precise surface work.

In addition, the surface 12a of the polymer brush layer 12 in which the polymer graft chains 121 thicken in a brush form has moderate flexibility, and thus exhibits excellent followability with respect to the surface to be sealed when contacting the surface to be sealed. Therefore, the influence of the surface texture (in particular, the surface roughness) of the surface to be sealed is also eased by the polymer brush layer 12 of the seal surface 1a, and good adhesion is obtained between the seal surface 1a and the surface to be sealed.

According to such a seal member 1 having the polymer brush layer 12 as the seal surface 1a, the seal surface 1a exhibits excellent sealing performance without being influenced by the surface textures of the substrate surface 11A corresponding to the seal surface 1a and the surface to be sealed.

The thickness of the polymer brush layer 12 formed as the seal surface 1a is not particularly limited, but the thickness is preferably greater than 0 nm and less than or equal to 10000 nm from the viewpoint of obtaining good sealing performance with the seal surface 1a, and more preferably greater than or equal to 100 nm and less than or equal to 2000 nm from the practical viewpoint.

It should be noted that the thickness of the coating layer 12 including the polymer brush layer 12 can be measured by measuring its dry thickness using ellipsometry. A specific measurement method is as described in the pages of Examples of Patent Literature 1. In addition, a more specific description of the polymer brush layer 12 is also seen in Patent Literature 1.

The material of the substrate 19 can be appropriately selected according to the application and usage pattern of the seal member 1 and the method of forming the polymer brush layer 12, for example. For example, hard ceramics, such as alumina and boron carbide, rubber, and plastics can be selected. The surface texture of the substrate 19 is not particularly limited. It is acceptable as long as the substrate surface 11A corresponding to the seal surface 1a, in particular, has moderate flatness and smoothness, and thus, the substrate surface 11A need not be subjected to precise surface work.

In a suitable example of the seal structure of the present disclosure, the polymer brush layer 12 is provided as the seal surface 1a. Therefore, the surface roughness of the substrate surface 11A corresponding to the seal surface 1a of the seal member 1 is eased by the polymer brush layer 12 even if the substrate surface 11A is a somewhat coarse surface, whereby the surface roughness hardly influences the sealing performance of the seal surface 1a.

Hereinafter, a method of forming the polymer brush layer 12 will be described with reference to a case where the polymer brush layer 12 is formed directly on the substrate surface 11A such as the one illustrated in FIG. 2 as an example.

The polymer brush layer 12 can be formed using a surface-initiated living radical polymerization method, for example. The surface-initiated living radical polymerization method is a method including the following to form the polymer graft chains 121:

(I) introducing a polymerization initiating group into the substrate surface 11A serving as the starting point of the polymer graft chains 121, and (II) performing the surface-initiated living radical polymerization method with the polymerization initiating group as the starting point.

Specifically, as such a surface-initiated living radical polymerization method, it is possible to use the method described in Arita, T., Kayama, Y., Ohno, K., Tsujii, Y. and Fukuda, T., "High-pressure atom transfer radical polymerization of methyl methacrylate for well-defined ultra high molecular-weight polymers, "Polymer, 49, 2008, 2426-2429 (hereinafter referred to as Literature P), Japanese Patent Laid-Open No. 2009-59659 (hereinafter referred to as Literature Q), Japanese Patent Laid-Open No. 2010-218984 (hereinafter referred to as Literature R), or Japanese Patent Laid-Open No. 2014-169787 (hereinafter referred to as Literature S), for example.

(I) Immobilization of Polymerization Initiating Group on Substrate Surface

Examples of the method of introducing the polymerization initiating group into the substrate surface 11A include, but are not particularly limited to, a method of dissolving or dispersing the polymerization initiator in a solvent to prepare a polymerization initiator solution, and immersing the substrate 19 in the prepared polymerization initiator solution.

The polymerization initiator is not particularly limited, but is preferably a compound containing a group capable of binding to the substrate surface 11A and a radical generating group. For example, the polymerization initiator disclosed in Literature P, Literature R, or Literature S can be widely used. Among these, the polymerization initiator is preferably an atom transfer radical polymerization (ATRP)-based polymerization initiator, and more preferably, (3-trimethoxysilyl) propyl 2-bromo-2-methylpropionate.

It should be noted that the substrate surface 11A is desirably cleaned as appropriate before the polymerization initiating group is introduced thereinto. The substrate surface 11A can be cleaned using a known method according to the material, shape, and the like of the substrate 19.

(II) Synthesis of Polymer Graft Chains Through Surface-Initiated Living Radical Polymerization The method of forming the polymer graft chains on the substrate surface 11A into which the polymerization initiating group has been introduced is not particularly limited. First, various components required for a polymerization reaction, such as a predetermined monomer and various low-molecular free initiators (i.e., radical initiators), are dissolved or dispersed in a solvent to prepare a polymerization reaction solution. Thereafter, the substrate 19 into which the polymerization initiating group has been preliminarily introduced is immersed in the prepared polymerization reaction solution, followed by pressurization and heating as appropriate, whereby the polymer graft chains 121 containing a predetermined monomer as a polymerization unit can be formed on the substrate surface 11A.

The method of preparing the polymerization reaction solution is not particularly limited. For example, the methods described in Literature P and Literature S can be suitably used, and monomers, low-molecular free initiators, and the like described in these literatures can be widely used. Among these, the polymerization reaction solution is preferably prepared using the method described in Literature P, and the monomer is preferably methyl methacrylate (hereinafter, MMA). In addition, ethyl 2-bromo-2-methylpropionate is preferably used as the low-molecular free initiator.

The reaction conditions of the surface-initiated living radical polymerization are not particularly limited. For example, the surface-initiated living radical polymerization can be performed under the conditions of Literature P and Literature S. Among these, the polymerization reaction is preferably performed using the method described in Literature P, and particularly preferably performed under pressurized conditions (for example, about greater than or equal to 400 MPa and less than or equal to 500 MPa) and heated conditions (for example, about greater than or equal to 50° C. and less than or equal to 60° C.). If the polymerization reaction is performed during pressurization, it is possible to form the polymer brush layer 12 that is denser (i.e., has a higher graft density of the polymer graft chains 121) and has a greater thickness (i.e., has a longer average molecular chain length).

The surface occupation rate $\sigma^*$ (i.e., the occupation rate per polymer cross-sectional area) of the polymer graft chains 121 formed on the substrate surface 11A with respect to the area of the substrate surface 11A is preferably greater than or equal to 10%, more preferably, greater than or equal to 15%, and further preferably, greater than or equal to 20%. The surface occupation rate $\sigma^*$ can be calculated by determining the polymer cross-sectional area from the repeating unit length of the polymer in a fully stretched state and the bulk density of the polymer, and then multiplying the resultant cross-sectional area by the graft density. More specifically, the surface occupation rate $\sigma^*$ can be determined according to the following formula. That is, the surface occupation rate $\sigma^*$ means the area rate of a graft point (i.e., a first monomer) in the substrate surface 11A (100% in closest packing, grafting cannot be performed so as to exceed 100%).

$$\sigma^*=(\text{polymer cross-sectional area})\times\text{graft density } \sigma$$

$$(\text{polymer cross-sectional area})=(\text{volume per monomer of graft chain portion})/(\text{repeating unit length of polymer in fully stretched state})$$

$$\text{volume per monomer of graft chain portion}=[\{(\text{molecular weight of monomer of graft chain portion})/(\text{Avogadro's number})\}/(\text{bulk density of polymer})].$$

The graft density $\sigma$ represents the number of the polymer graft chains 121 that are present per $nm^2$ ($chain/nm^2$). Specifically, the graft density $\sigma$ can be calculated from the absolute value of the number-average molecular weight (Mn) of the graft chains, the amount of a polymer grafted (i.e., the dry thickness of the polymer brush layer 12), and the surface area of the substrate surface 11A. In particular, a polymer brush having a graft density σ of greater than or equal to 0.1 chain/nm² is defined as a dense polymer brush. It should be noted that when the surface occupation rate σ* is 100% (i.e., closest packing), the upper limit of the theoretical graft density σ is 1.79 (chain/nm²) if PMMA is used.

The average molecular chain length Lp (that is, the polymer brush length) of the polymer graft chains 121 forming the polymer brush layer 12 is preferably greater than 0 nm and less than or equal to 10000 nm, and more preferably, within the range of 100 nm to 2000 nm from the practical viewpoint. If the average molecular chain length Lp of the polymer graft chains 121 is too short, the sealing performance tends to degrade. The average molecular chain length Lp of the polymer graft chains 121 can be adjusted by adjusting the polymerization conditions, for example.

The average molecular chain length Lp of the polymer graft chains 121 can be determined from, for example, the results of measuring the number-average molecular weight (Mn) and molecular weight distribution (Mw/Mn) of the polymer graft chains 121. For example, the number-average molecular weight (Mn) and molecular weight distribution (Mw/Mn) of the polymer graft chains 121 are measured by cutting out the polymer graft chains 121 from the substrate 19 through treatment with hydrofluoric acid, and performing measurement with the cut-out polymer graft chains 121 using a gel permeation chromatography method. Alternatively, it has been known that a free polymer to be produced during polymerization has the same molecular weight as the polymer graft chains 121 introduced onto the substrate 19. Thus, it is also possible to use a method of measuring the number-average molecular weight (Mn) and molecular weight distribution (Mw/Mn) of the free polymer using a gel permeation chromatography method, and using the resultant values as they are.

The molecular weight distribution (Mw/Mn) of the polymer graft chains 121 in the polymer brush layer 12 forming the seal surface 1a is preferably close to 1, suitably, less than or equal to 1.3, more preferably, less than or equal to 1.25, and still more preferably, less than or equal to 1.20, and particularly preferably, less than or equal to 1.15.

In the seal structure 10 according to the present embodiment, a silica coat layer may be provided between the substrate surface 11A and the polymer brush layer 12. The silica coat layer can be provided by, for example, performing silica coating treatment on the substrate surface 11A with a sol-gel method using alkoxysilane.

The types and conditions of the silica coating treatment performed with the sol-gel method using alkoxysilane are not particularly limited as long as the silica coat layer can be provided. Examples of the silica coating treatment performed with the sol-gel method using alkoxysilane include a method of dissolving or dispersing alkoxysilane, such as tetraalkoxysilane, and an alkaline aqueous solution, such as 28 mass % of ammonia water, in a solvent to prepare a reaction solution, and immersing the substrate 19 in the prepared reaction solution. In the silica coating treatment performed with the sol-gel method using alkoxysilane, alkoxysilane is converted into silica ($SiO_2$) through hydrolysis, for example.

The polymer brush layer 12 can be provided on the surface of the silica coat layer as in the case where the polymer brush layer 12 is provided directly on the substrate surface 11A.

The substrate surface 11A is desirably cleaned as appropriate before the silica coat layer is provided thereon as in the case where the aforementioned polymer brush layer 12 is provided. The substrate surface 11A can be cleaned using a known method according to the material, shape, and the like of the substrate 19.

The polymer brush layer 12 is preferably a layer obtained by swelling the polymer graft chains 121 formed on the substrate surface 11A using a liquid substance (i.e., a swelling liquid). The liquid substance for swelling the polymer graft chains 121 is not particularly limited as long as it is a compound that exhibits swelling properties to the polymer graft chains 121, but is preferably an ionic liquid from the viewpoint of high affinity thereof for the polymer graft chains 121. It should be noted that even when the coating layer 12 is a layer other than a polymer brush layer, it is preferable to use as the liquid substance a compound that exhibits swelling properties to the material forming such a layer, and is more preferable to use an ionic liquid.

Examples of an ionic liquid that is preferable as the liquid substance for swelling the polymer brush layer 12 include those described in Literature S. Among these, N,N-diethyl-N-methyl-(2-methoxyethyl)ammonium bis(trifluoromethanesulfonyl)imide (hereinafter also referred to as "DEME-TFSI") and methoxyethylmethylpyrrolidinium bis(trifluoromethanesulfonyl)imide (hereinafter also referred to as "MEMP-TFSI") are preferable as the ionic liquid.

Examples of the method of swelling the polymer graft chains 121 formed on the substrate surface 11A using a liquid substance include, but are not particularly limited to, a method of applying a liquid substance to the polymer graft chains 121 formed on the substrate surface 11A and leaving it, or a method of immersing the substrate 19 having the polymer graft chains 121 formed thereon in a liquid substance.

It should be noted that in the present embodiment, as illustrated in FIG. 1, the internal space of the housing 15 is filled with the swelling liquid 17. The swelling liquid 17 filling the internal space of the housing 15 is in contact with the end portions of the first coating layer 12A and the second coating layer 12B. Thus, the first coating layer 12A and the second coating layer 12B can be impregnated with the swelling liquid 17 and thus can be swollen.

In the seal structure 10 of the present embodiment, the internal space of the housing 15 is always filled with the swelling liquid 17 unless the swelling liquid 17 leaks from the opening 15a on the other side (i.e., the upper side (a)) in the direction of the axis x. Thus, the first coating layer 12A and the second coating layer 12B are always supplied with the swelling liquid 17, and the swollen states of such layers are maintained.

As described above, the seal member 1 used for the seal structure 10 according to the present embodiment has the coating layer 12 as the seal surface 1a, whereby the seal surface 1a exhibits excellent sealing performance without being influenced by the surface textures of the substrate surface 11A corresponding to the seal surface 1a and the surface to be sealed.

Usually, in a seal structure of a mechanical seal, hard materials, such as hard ceramics like alumina and silicon carbide, are widely used for a substrate from the viewpoints of wear resistance and heat resistance, for example. In addition, usually, a surface to be contacted by a seal surface (i.e., a surface to be sealed) is commonly machined to have high flatness and high smoothness from the viewpoint of securing sufficient sealing performance (in particular, static sealing performance).

To machine the substrate surface as such a seal surface to allow it to have high flatness and high smoothness, high-precision surface work is required. However, since the aforementioned hard materials have poor workability, it would be difficult to subject the substrate surface as the seal surface to high-precision surface finishing, with the result that leakage is disadvantageously likely to occur.

However, in the seal member 1, even if the substrate surface corresponding to each seal surface is not subjected to precise surface finishing, at least one of the seal surfaces has a coating layer provided thereon. Thus, the presence of such a coating layer eases the influence of the surface texture of each substrate surface, and each seal surface can thus secure high sealing performance. This can effectively prevent the occurrence of leakage.

In the seal structure 10 of the present embodiment, first, the first coating layer 12A is formed on the inner peripheral surface 11d of the shaft hole 11c of the bush 11 as the substrate 19 (which corresponds to the substrate surface 11A in FIG. 2), so that the seal member 1 described with reference to FIG. 2 is formed. Therefore, excellent sealing performance can be secured between the inner peripheral surface 11d of the shaft hole 11c of the bush 11 and the outer peripheral surface of the shaft 13, which rubs the inner peripheral surface 11d when the shaft 13 rotates counterclockwise (i.e., in the direction of the arrow T). This can effectively prevent the occurrence of leakage.

In the present embodiment, one side (i.e., the lower side (b)) in the direction of the axis x is at P2 (for example, a vacuum pressure V), and the other side (i.e., the upper side (a)) is at P1 (for example, an atmospheric pressure AP). Thus, a load is applied to one side (i.e., the lower side (b)) in the direction of the axis x due to the pressure difference (P1-P2). In addition, as the shaft 13 slides in a reciprocating manner by moving between the upper side (a) and the lower side (b) in the direction of the axis x, a load is applied to the other side (i.e., the upper side (a)) and one side (i.e., the lower side (b)) in the direction of the axis x. In any case, the load is applied in the axial direction, and no contact load in the direction perpendicular to the first coating layer 12A or the like is applied. Thus, since a load applied to the first coating layer 12A is small, wear of the first coating layer 12A can be suppressed.

In addition, in the present embodiment, since the springs 14 are adapted to press the bush 11 against the ring member 16 from the other side (i.e., the upper side (a)) in the direction of the axis x, the bush 11 is allowed to have a posture inclined to a certain degree from the state in which the axis of the bush 11 coincides with the axis x. The upper side (a), which is connected to the springs 14, of the bush 11 with its posture having changed following the inclination of the shaft 13 moves slightly in the direction intersecting the axis x due to the flexibility of the springs 14, and the lower side (b) of the bush 11 moves like a pendulum with the upper side (a) as the base point.

Since the end surface 11b of the bush 11 on one side (i.e., the lower side (b)) in the direction of the axis x is pressed against the ring member 16, which is a pressure-receiving member, with an elastic extension force of the springs 14, the end surface 11b is allowed to move in a direction within the contact surface of the facing surface 16a of the ring member 16.

According to such a configuration, even when the shaft 13 becomes eccentric with respect to the axis x or is inclined into a swinging state, the bush 11 can change its posture and follow the eccentric position or inclination of the shaft 13. Thus, even when the shaft 13 becomes eccentric or is inclined with respect to the axis x, it is possible to achieve the effects of excellently improving the sealing performance and providing low frictional properties.

In the seal structure 10 of the present embodiment, the second coating layer 12B is further formed on the facing surface 16a of the ring member 16 as the substrate 19 (which corresponds to the substrate surface 11A in FIG. 2), so that the seal member 1 described with reference to FIG. 2 is formed. In addition, since the end surface 11b of the bush 11 is pressed against the second coating layer 12B with an elastic extension force of the springs 14, a contact load is applied to the second coating layer 12B.

Therefore, even when the bush 11 has changed its posture following the inclination of the shaft 13, and the end surface 11b of the bush 11 thus contacts the facing surface 16a of the ring member 16 and slightly slides thereon in a direction within the contact surface, it is possible to achieve the effects of excellently improving the sealing performance and providing low frictional properties due to the function of the second coating layer 12B.

That is, in the present embodiment, a contact load is not applied between the inner peripheral surface 11d of the bush 11, which always slides on the shaft 13 during the rotation of the shaft 13, and the outer peripheral surface of the shaft 13. Therefore, it is possible to suppress the load applied to the first coating layer 12A, and thus achieve the effects of satisfactorily improving the sealing performance and providing low frictional properties for a long term.

Meanwhile, a contact load is actively applied between the end surface 11b of the bush 11, which does not slide or slides only slightly and not frequently, and the facing surface 16a of the ring member 16, by the springs 14. Therefore, it is possible to secure excellent sealing performance while utilizing the effects of low frictional properties obtained with the second coating layer 12B, and thus effectively prevent the occurrence of leakage.

Second Embodiment

Figure 3:
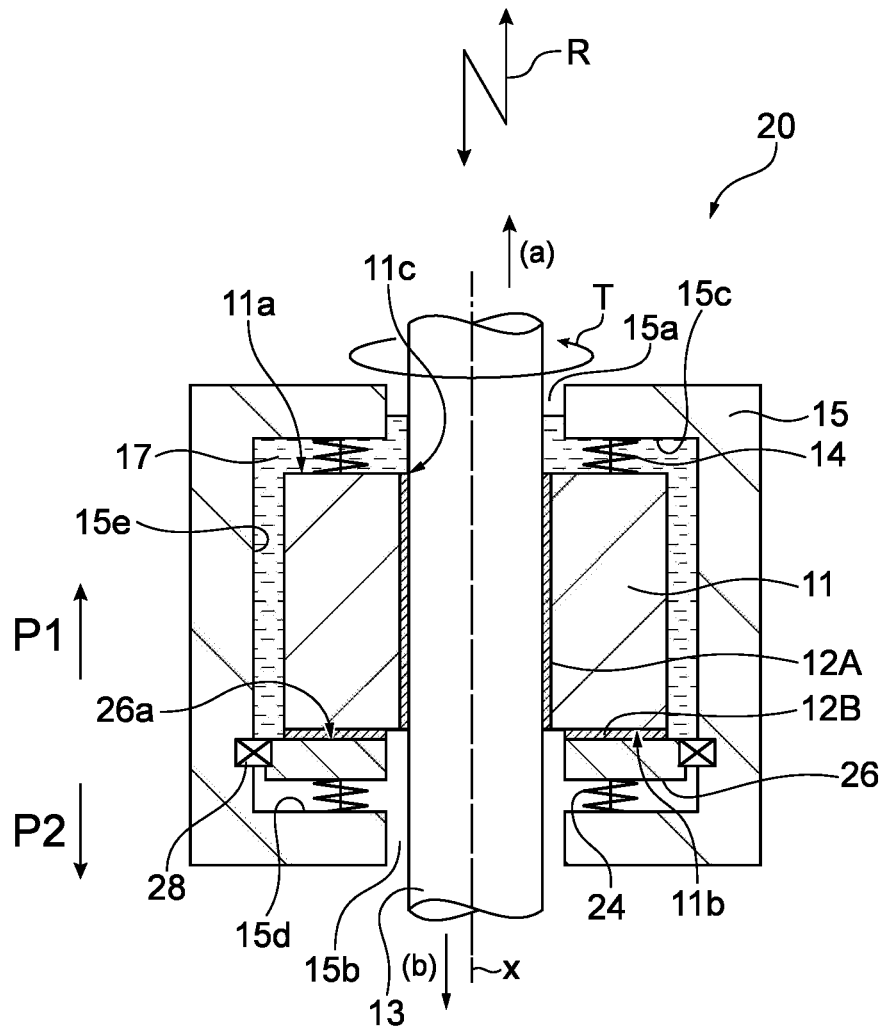
FIG. 3 is a cross-sectional view of a cross-section along an axis for illustrating the schematic configuration of a seal structure according to a second embodiment as an exemplary aspect of the present disclosure.

FIG. 3 is a cross-sectional view of a cross-section along the axis x for illustrating the schematic configuration of a seal structure 20 according to a second embodiment as an exemplary aspect of the present disclosure. The configuration of the seal structure 20 according to the present embodiment will be described with reference to FIG. 3.

The seal structure 20 according to the second embodiment has the same shape and configuration as those of the seal structure 10 according to the first embodiment except some structures. Accordingly, in FIG. 3 of the present embodiment, members with the same configurations as those of the first embodiment are denoted by the same reference signs as those of the first embodiment, and the detailed description thereof will be omitted.

See the description in the first embodiment mainly made with reference to FIG. 2 for a configuration around a surface on which a coating layer 12 is formed (i.e., a seal member 1) in the seal structure 20 according to the second embodiment (the same is true of seal structures 30 and 40 in the following embodiments).

In the present embodiment, between an inner surface region 15d of a housing 15 and a ring member 26 serving as a pressure-receiving member, springs (i.e., elastic members for the ring member) 24 for a ring member 26 are further provided. The springs 24 push the ring member 26 against a bush 11 from one side (i.e., the lower side (b)) in the direction of the axis x.

The springs 24 are provided between the inner surface region 15d of the housing 15 surrounding, of openings 15a and 15b of the housing 15, the opening 15b on one side (i.e., the lower side (b)) in the direction of the axis x and an end surface 11b of the bush 11 on one side (i.e., the lower side (b)) in the direction of the axis x. The springs 24 press the ring member 26 against the bush 11 from one side (i.e., the lower side (b)) in the direction of the axis x. Thus, a facing surface 26a of the ring member 26 having a second coating layer 12B formed thereon is pressed against the end surface 11b of the bush 11 due to the elastic action (i.e., the restoring action in the extension direction) of the springs 24.

Further, the other end side (i.e., the upper side (a)) of each spring 24 along its direction of expansion and contraction (which is the same as the direction of the axis x) is connected to the ring member 26, and one end side (i.e., the lower side (b)) of each spring 24 is connected to the inner surface (i.e., the inner surface region 15d) of the housing 15. Although FIG. 3 schematically illustrates a pair of right and left springs 24, three springs are, in practice, arranged at equiangular (or rotationally symmetric) positions (that is, at positions of a circumference angle of 120°) along the circumferential direction of the surface of the annular ring member 26 as seen from one end side (i.e., the lower side (b)) in the direction of the axis x.

A seal ring 28 is attached to the outer periphery of the ring member 26. Since the ring member 26 is movable in the direction of the axis x, it would be impossible to arrange the seal ring between the edge of the central hole of the ring member 16 on the side of the housing 15 (i.e., the lower side (b)) and the inner surface region 15d of the housing 15 like the seal ring 18 of the first embodiment.

Thus, in the present embodiment, the ring member 26 is allowed to move in the direction of the axis x as the seal ring 28 attached to the outer periphery of the ring member 26 frictionally slides on an inner peripheral surface 15e of the housing 15. The seal ring 28 blocks and seals a swelling liquid 17, and thus prevents the swelling liquid 17 from passing across the boundary between the inner peripheral surface 15e of the housing 15 and the outer periphery of the ring member 26.

In the present embodiment, a configuration substantially similar to that of the first embodiment is provided. Thus, functions and effects similar to those of the first embodiment can be achieved. In the present embodiment, not only the functions and effects similar to those of the first embodiment, but also functions and effects obtained with the provision of the springs 24 as the elastic members for the ring member can be expected to be achieved.

That is, since the bush 11 and the ring member 26 that abut each other with the second coating layer 12B interposed therebetween are held so as to be sandwiched by the springs 14 and the springs 24 from the opposite sides in the direction of the axis x, the bush 11 and the ring member 26 can be stably supported. In addition, since the bush 11 and the ring member 26 are held by the elastic springs 14 and the elastic springs 24 on the opposite sides in the direction of the axis x, the degree of freedom of the posture of each of the bush 11 and the ring member 26 is increased, and followability thus improves. Thus, it is possible to achieve the effects of improving the sealing performance and providing low frictional properties at a higher level when the shaft 13 becomes eccentric or is inclined with respect to the axis x.

Third Embodiment

Figure 4:
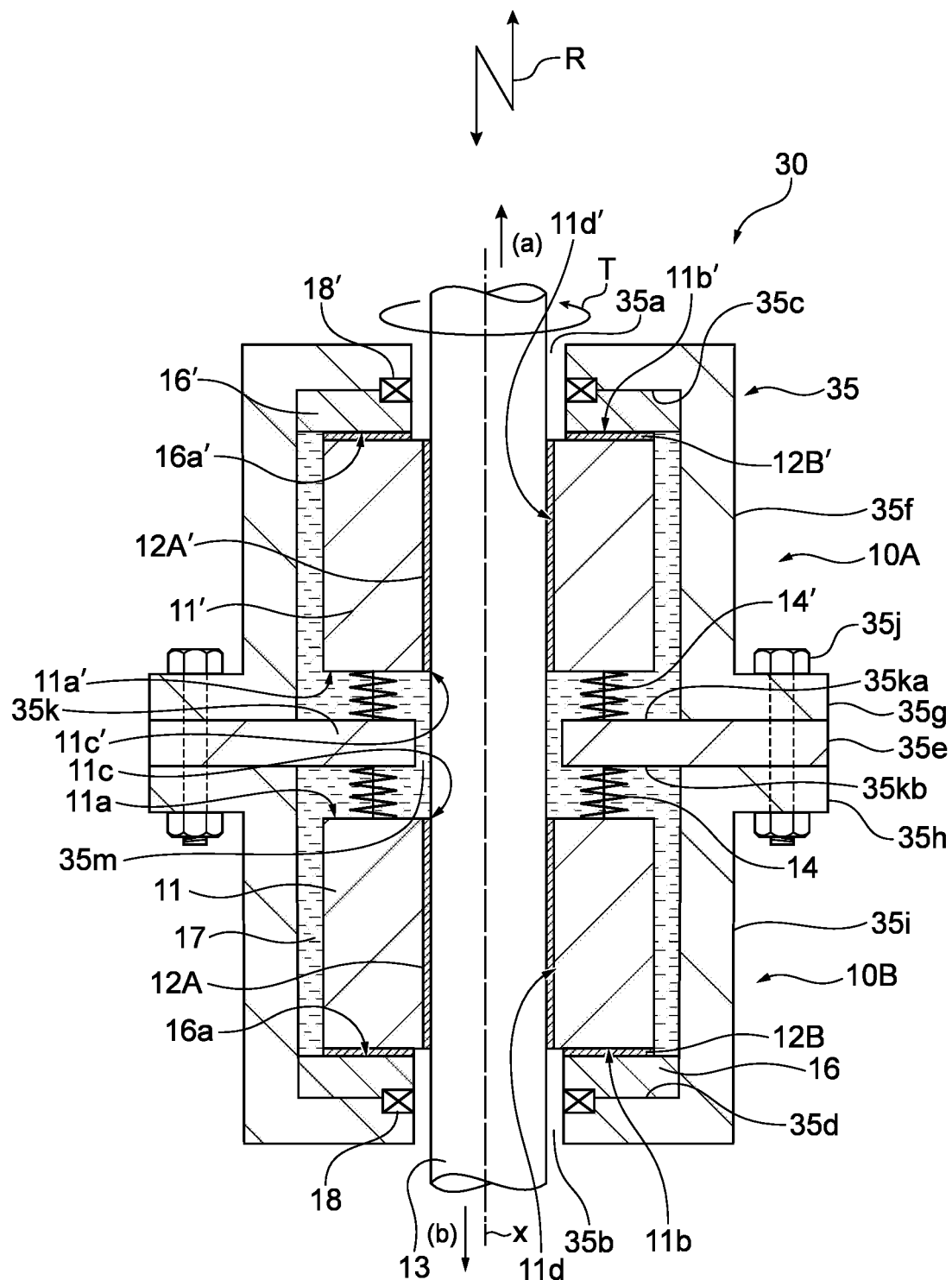
FIG. 4 is a cross-sectional view of a cross-section along an axis for illustrating the schematic configuration of a seal structure according to a third embodiment as an exemplary aspect of the present disclosure.

FIG. 4 is a cross-sectional view of a cross-section along the axis x for illustrating the schematic configuration of a seal structure 30 according to a third embodiment as an exemplary aspect of the present disclosure. The configuration of the seal structure 30 according to the present embodiment will be described with reference to FIG. 4.

The seal structure 30 according to the third embodiment includes two seal units 10A and 10B sharing a single housing 35 for a single shaft 13. The two seal units 10A and 10B each have a structure substantially similar to that of the seal structure 10 according to the first embodiment (i.e., an aspect of the seal structure of the present disclosure), and are arranged in a mutually inverted state.

Thus, each of the two seal units 10A and 10B has the same shape and configuration as those of the seal structure 10 according to the first embodiment except some structures. Accordingly, in FIG. 4 of the present embodiment, members of the seal unit 10B with the same configurations as those of the first embodiment are denoted by the same reference signs as those of the first embodiment, and the detailed description thereof will be omitted. In addition, members of the seal unit 10A with the same configurations as those of the first embodiment are denoted by the same reference signs as those of the first embodiment with "' (prime)" added thereto, and the detailed description thereof will be similarly omitted.

The housing 35 includes a cup member 35f partially forming the seal unit 10A, a cup member 35i partially forming the seal unit 10B, and a disk member 35e having an opening 35m for passing the shaft 13 at the center. The cup members 35f and 35i respectively have flange portions 35g and 35h extending outward from the edges of the openings of the cups.

The cup member 35f and the cup member 35i are arranged such that the openings of the cups face each other and the flange portion 35g and the flange portion 35h are fastened together with fasteners 35j each including a vis and a nut, for example, while sandwiching the disk member 35e therebetween. Accordingly, a single housing 35 is formed as a whole.

The internal space of the housing 35 is a hermetically sealed space that allows the side of the seal unit 10A and the side of the seal unit 10B to communicate with each other through the opening 35m. The hermetically sealed space (i.e., the internal space) is filled with a swelling liquid 17 for swelling first coating layers 12A and 12A' and second coating layers 12B and 12B' in the seal unit 10A and the seal unit 10B.

In the seal unit 10B, the housing 15 of the seal structure 10 according to the first embodiment is replaced with the aforementioned housing 35. The housing 35 has openings (i.e., through-holes) 35a and 35b for passing the shaft 13 in its opposite end surfaces along the direction of the axis x. In the seal unit 10B, the opening 35b of the housing 35 closer to the ring member 16 corresponds to the opening 15b on one side (i.e., the lower side (b)) in the direction of the axis x in the seal structure 10 according to the first embodiment (see FIG. 1).

In the seal unit 10A also, the housing 15 of the seal structure 10 according to the first embodiment is replaced with the aforementioned housing 35. It should be noted that in the seal unit 10A arranged in a position vertically inverted from the seal unit 10B, the opening 35a of the housing 35 closer to the ring member 16' corresponds to the opening 15b on one side (i.e., the lower side (b)) in the direction of the axis x in the seal structure 10 according to the first embodiment (see FIG. 1).

In other words, the opening (i.e., the through-hole) 35a of the housing 35 on the other side in the direction of the axis x in one seal unit 10B corresponds to the opening on one side in the direction of the axis x (which corresponds to the opening 15b in FIG. 1) in the other seal unit 10A.

The disk member 35e is located at the center of the housing 35 along the direction of the axis x. In addition, a region of the disk member 35e closer to the axis x than is the region sandwiched by the flange portions 35g and 35h is a disk-like (flat) protruding portion 35k protruding from the inner peripheral surface of the housing 35 toward the shaft 13.

In the two seal units 10A and 10B, springs (i.e., elastic members) 14' and 14 are respectively provided between surfaces 35ka and 35kb of the protruding portion 35k on the sides of the respective seal structures and end surfaces 11a' and 11a of the bushes 11' and 11 facing the protruding portion 35k.

In addition, in the two seal units 10A and 10B, one end sides (i.e., the upper side (a) in the seal unit 10A and the lower side (b) in the seal unit 10B) of the springs 14' and 14 along their directions of expansion and contraction (which are the same as the direction of the axis x) are respectively connected to the bushes 11' and 11, and the other sides of the springs 14' and 14 are connected to the protruding portion 35k.

It should be noted that the shape of the protruding portion 35k is not limited to a disk. For example, only the portions of the protruding portion 35k to which the springs (i.e., the elastic members) 14' and 14 abut or are fixed may have a shape protruding from the inner peripheral surface of the housing 35. In such a case, the shape of the protruding portions is preferably flat, but any shape is acceptable as long as the springs (i.e., the elastic members) 14' and 14 can abut the protruding portions or can be fixed thereto as appropriate.

In the present embodiment, the seal units 10A and 10B each having a configuration substantially similar to that of the first embodiment are provided. Thus, functions and effects similar to those of the first embodiment can be achieved. In the present embodiment, not only the functions and effects similar to those of the first embodiment, but also functions and effects unique to the present embodiment can be expected to be achieved.

That is, the present embodiment provides a unique configuration in which the two seal units 10A and 10B sharing a single housing 35 are provided for a single shaft 13, and thus, there is no possibility of leakage of the swelling liquid 17 filling the internal space, which is a hermetically sealed space, of the housing 35. Thus, no matter how the seal structure 30 according to the present embodiment is applied such that its top and bottom sides are inclined or tipped over, the sealing effect is not influenced. This can significantly ease the restrictions on the applicable conditions, such as the applicable range, applicable environments, and applicable places.

In addition, since the internal space of the housing 35 filled with the swelling liquid 17 is a hermetically sealed space, there is no concern that foreign matter may intrude into the space from outside, or the swelling liquid 17 may evaporate and thus may have a reduced volume. Therefore, with the seal structure 30 according to the present embodiment, it is possible to reduce the concern that the effects of the sealing performance and low frictional properties may decrease due to degradation of the swelling liquid 17 resulting from foreign matter that has intruded into the space, damage to the interior members, or shortage of the swelling liquid 17, and thus reduce the labor of replenishing the space with the swelling liquid 17 or replacing the swelling liquid 17. Thus, with the seal structure 30 according to the present embodiment, it is possible to maintain the effects of excellently improving the sealing performance and providing low frictional properties for a long term in a wide applicable range.

Fourth Embodiment

Figure 5:
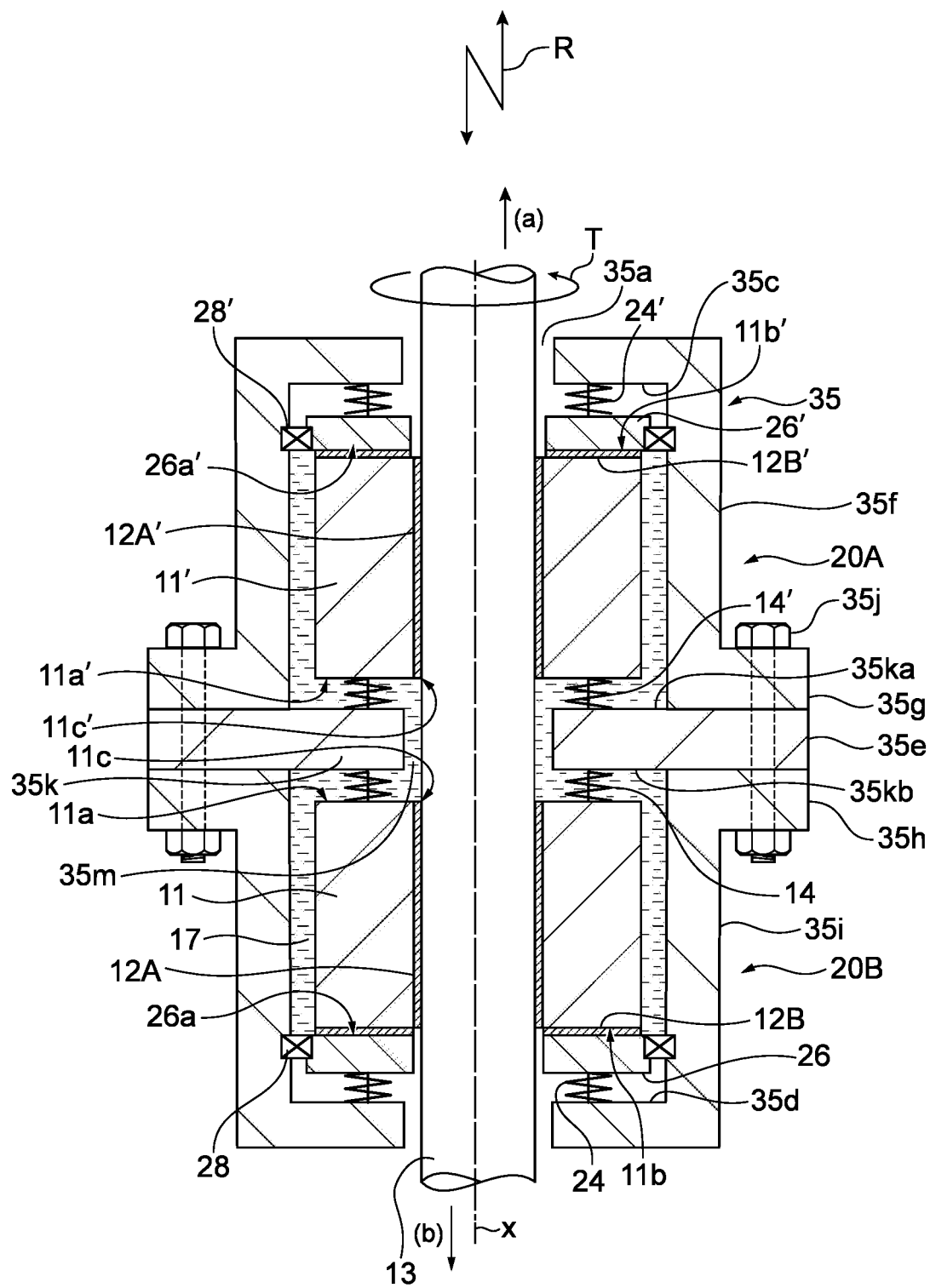
FIG. 5 is a cross-sectional view of a cross-section along an axis for illustrating the schematic configuration of a seal structure according to a fourth embodiment as an exemplary aspect of the present disclosure.

FIG. 5 is a cross-sectional view of a cross-section along the axis x for illustrating the schematic configuration of a seal structure 40 according to a fourth embodiment as an exemplary aspect of the present disclosure. The configuration of the seal structure 40 according to the present embodiment will be described with reference to FIG. 5.

The seal structure 40 according to the fourth embodiment includes two seal units 20A and 20B sharing a single housing 35 for a single shaft 13. The two seal units 20A and 20B each have a structure substantially similar to that of the seal structure 20 according to the second embodiment (i.e., an aspect of the seal structure of the present disclosure), and are arranged in a mutually inverted state.

Thus, each of the two seal units 20A and 20B has the same shape and configuration as those of the seal structure 20 according to the second embodiment except some structures. Accordingly, in FIG. 5 of the present embodiment, members of the seal unit 20B with the same configurations as those of the second embodiment are denoted by the same reference signs as those of the second embodiment, and the detailed description thereof will be omitted. In addition, members of the seal unit 20A with the same configurations as those of the second embodiment are denoted by the same reference signs as those of the second embodiment with "' (prime)" added thereto, and the detailed description thereof will be similarly omitted.

In addition, the single housing 35 shared by the two seal units 20A and 20B has the same shape and configuration as those of the seal structure 30 according to the third embodiment. Accordingly, in FIG. 5 of the present embodiment, the housing 35 and its constituent members or related members (i.e., those including a reference sign 35) are denoted by the same reference signs as those of the third embodiment, and the detailed description thereof will be omitted.

In the present embodiment, between inner surface regions 15d' and 15d of the single housing 35 shared by the two seal units 20A and 20B and ring members 26' and 26 each serving as a pressure-receiving member, springs (i.e., elastic members for the ring members) 24' and 24 for the ring member 26' and 26 are further provided, respectively. The springs 24' and 24 respectively press the ring members 26' and 26 against bushes 11' and 11 from one side (i.e., the upper side (a) in the seal unit 20A and the lower side (b) in the seal unit 20B) in the direction of the axis x.

The springs 24' and 24 are respectively provided between inner surface regions 35c and 35d of the housing 35 surrounding openings 35a and 35b on one side (i.e., the upper side (a) in the seal unit 20A and the lower side (b) in the seal unit 20B) in the direction of the axis x and end surfaces 11b' and 11b of the bushes 11' and 11 on one side (i.e., the upper side (a) in the seal unit 20A and the lower side (b) in the seal unit 20B) in the direction of the axis x.

The springs 24' and 24 respectively press the ring members 26' and 26 against the bushes 11' and 11 from one side (i.e., the upper side (a) in the seal unit 20A and the lower side (b) in the seal unit 20B) in the direction of the axis x. Thus, opposed surfaces 26a' and 26a of the ring members 26' and 26 having second coating layers 12B' and 12B formed thereon are respectively pressed against the end surfaces 11b' and 11b of the bushes 11' and 11 due to the elastic action (i.e., the restoring action in the extension direction) of the springs 24' and 24.

Further, the other end sides (i.e., the lower side (b) in the seal unit 20A and the upper side (a) in the seal unit 20B) of the springs 24' and 24 along their directions of expansion and contraction (which are the same as the direction of the axis x) are respectively connected to the ring members 26' and 26, and one end sides (i.e., the upper side (a) in the seal unit 20A and the lower side (b) in the seal unit 20B) of the springs 24' and 24 are respectively connected to the inner surfaces (i.e., the inner surface region 35c in the seal unit 20A and the inner surface region 35d in the seal unit 20B) of the housing 35. It should be noted that in FIG. 5, three springs 24' and 24 are respectively arranged along the circumferential direction of the surfaces of the annular ring members 26' and 26 as with the springs 24 of the second embodiment.

Seal rings 28' and 28 are respectively attached to the outer peripheries of the ring members 26' and 26. The ring members 26' and 26 are allowed to move in the direction of the axis x as the seal rings 28' and 28 respectively frictionally slide on inner peripheral surfaces 35n and 35p of the housing 35 as in the second embodiment. The seal rings 28' and 28 block and seal a swelling liquid 17. Thus, the internal space of the housing 35 is a hermetically sealed space that allows the side of the seal unit 20A and the side of the seal unit 20B to communicate with each other through the opening 35m.

In the present embodiment, a configuration substantially similar to that of the first embodiment is provided. Thus, functions and effects similar to those of the first embodiment can be achieved. In the present embodiment, not only the functions and effects similar to those of the first embodiment, but also functions and effects obtained with the provision of the springs 24' and 24 as the elastic members for the ring members can be expected to be achieved.

That is, since the bushes 11' and 11 and the ring members 26' and 26 that respectively abut each other with the second coating layers 12B' and 12B interposed therebetween are held so as to be sandwiched by the springs 14' and 14 and the springs 24' and 24 from the opposite sides in the direction of the axis x, the bushes 11' and 11 and the ring members 26' and 26 can be stably supported. In addition, since the bushes 11' and 11 and the ring members 26' and 26 are respectively held by the elastic springs 14' and 14 and the elastic springs 24' and 24 on the opposite sides in the direction of the axis x, the degree of freedom of the posture of each of the bushes 11' and 11 and the ring members 26' and 26 is increased, and followability thus improves. Thus, it is possible to achieve the effects of improving the sealing performance and providing low frictional properties at a higher level when the shaft 13 becomes eccentric or is inclined with respect to the axis x.

Further, the present embodiment provides a unique configuration in which the two seal units 20A and 20B sharing a single housing 35 are provided for a single shaft 13, and thus, there is no possibility of leakage of the swelling liquid 17 filling the internal space, which is a hermetically sealed space, of the housing 35. Thus, no matter how the seal structure 40 according to the present embodiment is applied such that its top and bottom sides are inclined or tipped over, the sealing effect is not influenced. This can significantly ease the restrictions on the applicable conditions, such as the applicable range, applicable environments, and applicable places.

In addition, since the internal space of the housing 35 filled with the swelling liquid 17 is a hermetically sealed space, there is no concern that foreign matter may intrude into the space from outside, or the swelling liquid 17 may evaporate and thus may have a reduced volume. Therefore, with the seal structure 40 according to the present embodiment, it is possible to reduce the concern that the effects of the sealing performance and low frictional properties may decrease due to degradation of the swelling liquid 17 resulting from foreign matter that has intruded to the space, damage to the interior members, or shortage of the swelling liquid 17, and thus reduce the labor of replenishing the space with the swelling liquid 17 or replacing the swelling liquid 17. Thus, with the seal structure 40 according to the present embodiment, it is possible to maintain the effects of excellently improving the sealing performance and providing low frictional properties for a long term in a wide applicable range.

Fifth Embodiment

Figure 6:
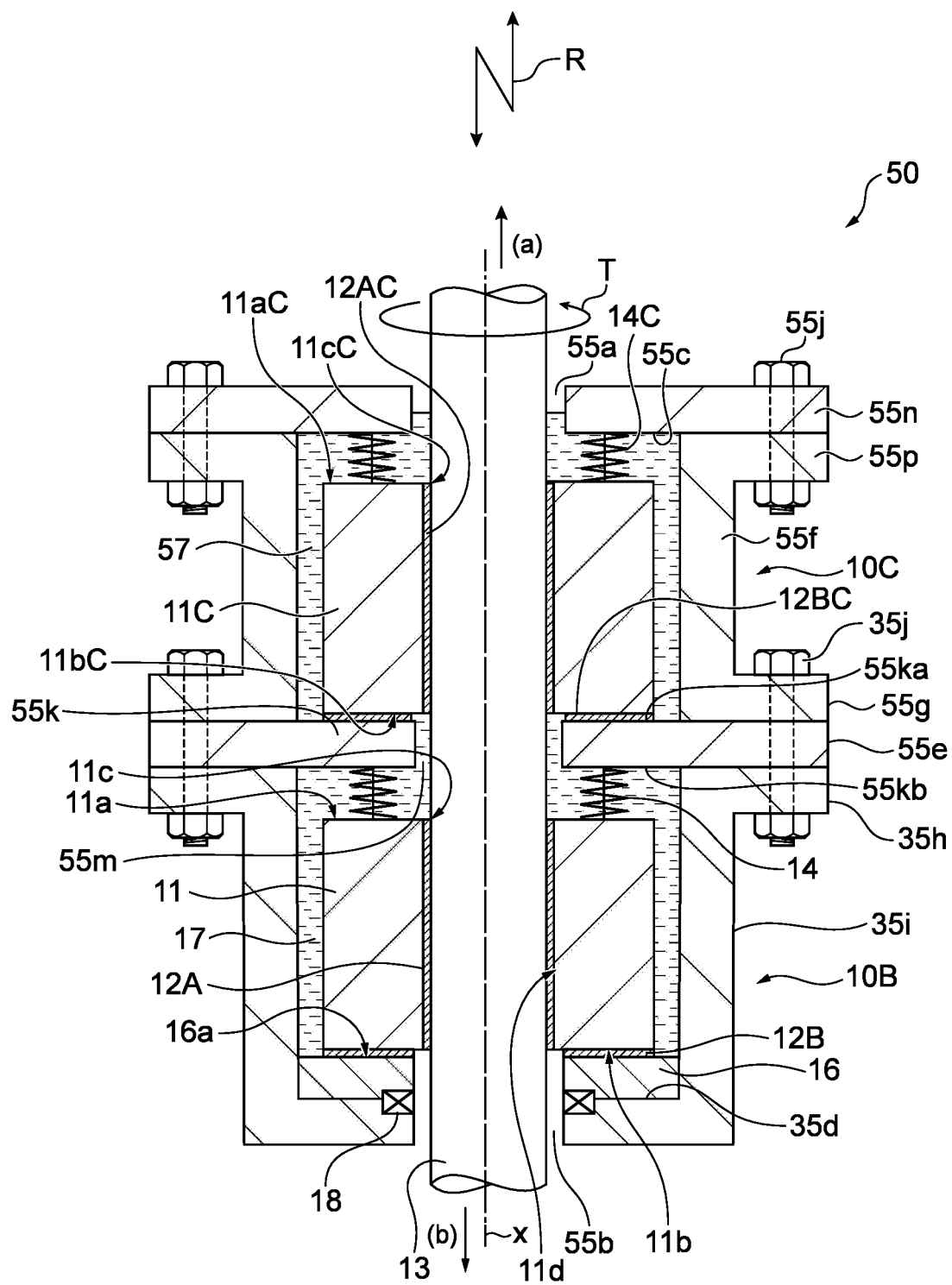
FIG. 6 is a cross-sectional view of a cross-section along an axis for illustrating the schematic configuration of a seal structure according to a fifth embodiment as an exemplary aspect of the present disclosure.

FIG. 6 is a cross-sectional view of a cross-section along the axis x for illustrating the schematic configuration of a seal structure 50 according to a fifth embodiment as an exemplary aspect of the present disclosure. The configuration of the seal structure 50 according to the present embodiment will be described with reference to FIG. 5.

The seal structure 50 according to the fifth embodiment includes two seal units 10B and 10C sharing a single housing 55 for a single shaft 13. The two seal units 10B and 10C each have a structure substantially similar to that of the seal structure 10 according to the first embodiment (i.e., an aspect of the seal structure of the present disclosure), and the orientations of the pair of the adjacent seal units 10B and 10C are the same along the direction of the axis x.

Thus, each of the two seal units 10B and 10C has the same shape and configuration as those of the seal structure 10 according to the first embodiment except some structures. Accordingly, in FIG. 6 of the present embodiment, members of the seal unit 10B with the same configurations as those of the first embodiment are denoted by the same reference signs as those of the first embodiment, and the detailed description thereof will be omitted. In addition, members of the seal unit 10C with the same configurations as those of the first embodiment are denoted by the same reference signs as those of the first embodiment with "C" added thereto, and the detailed description thereof will be similarly omitted. Besides, some of the structures of the housing 55 have the same shapes and configurations as those of the housing 35 according to the third embodiment. Accordingly, such members are denoted by the same reference signs as those of the third embodiment, and the detailed description thereof will be omitted.

The housing 55 includes disk members 55n and 55e partially forming the seal unit 10C and respectively having openings 55a and 55m for passing the shaft 13 at the center, a cylindrical portion 55f partially forming the seal unit 10C as well and having flange portions 55p and 55g at its opposite ends along the direction of the axis x, and a cup member 35i partially forming the seal unit 10B.

The flange portion 55g of the cylindrical portion 55f and a flange portion 35h of the cup member 35i are fastened together with fasteners 35j while sandwiching the disk member 55e therebetween. In addition, the disk member 55n is fastened to the upper side (a) of the other flange portion 55p of the cylindrical portion 55f with fasteners 55j each including a vis and a nut, for example. Accordingly, a single housing 55 is formed as a whole.

In the present embodiment, springs 14 of the seal unit 10B are provided between a surface 55kb on the lower side (b) of a protruding portion 55k of the disk member 55e, which corresponds to the inner surface region of the housing 55, and an end surface 11a of a bush 11. The springs 14 are connected to the surface 55kb and the end surface 11a.

Springs 14C of the seal unit 10C are provided between a surface 55c on the lower side (b) of the disk member 55n, which corresponds to the inner surface region of the housing 55, and an end surface 11aC of a bush 11C. The springs 14C are connected to the surface 55c and the end surface 11aC.

In the present embodiment, there is no member like the ring member 16 between the bush 11C and a surface 55ka of the protruding portion 55k of the disk member 55n, which corresponds to the inner surface region of the housing 55, in the seal unit 10C.

Therefore, a facing surface that faces an end surface 11bC of the bush 11C on one side (i.e., the lower side (b)) in the direction of the axis x is the surface 55ka, and the housing 55 having the surface 55ka forms the pressure-receiving member as referred to in the present disclosure. In addition, a second coating layer 12BC of the seal unit 10C is formed on the surface 55ka.

The springs 14C press the bush 11C against the surface 55ka of the housing 55 from the other side (i.e., the upper side (a)) in the direction of the axis x. Thus, the end surface 11bC of the bush 11C is pressed against the surface 55ka having the second coating layer 12BC formed thereon due to the elastic action (i.e., the restoring action in the extension direction) of the springs 14C.

In the housing 55, the internal space on the side of the seal unit 10B communicates with the side of the seal unit 10C through the opening 55m, but is sealed by a first coating layer 12AC and the second coating layer 12BC in the seal unit 10C on the upper side (a) immediately above it. Therefore, the internal space on the side of the seal unit 10B is a hermetically sealed space.

Meanwhile, the internal space on the side of the seal unit 10C communicates with the outside on the upper side (a) through the opening 55a, but is sealed by the first coating layer 12AC and the second coating layer 12BC on the lower side (b). Therefore, the internal space on the side of the seal unit 10C is separated from the internal space on the side of the seal unit 10B, and thus can be filled with a swelling liquid (i.e., a liquid substance) 57 of a different type from that of the swelling liquid 17 filling the internal space on the side of the seal unit 10B.

In the present embodiment, the seal units 10B and 10C each having a configuration substantially similar to that of the first embodiment are provided. Thus, functions and effects similar to those of the first embodiment can be achieved. In the present embodiment, not only the functions and effects similar to those of the first embodiment, but also functions and effects unique to the present embodiment can be expected to be achieved.

That is, in the present embodiment, another seal unit 10B is provided adjacent to one side (i.e., the lower side (b)) of the seal unit 10C along the direction of the axis x. The gap between one side (i.e., the lower side (b)) of the seal unit 10C along the direction of the axis x and the adjacent seal unit 10B is sealed.

Therefore, the swelling liquids 17 and 57 can respectively fill different rooms on the sealed side (i.e., the side of the seal unit 10B) and the open side (i.e., the side of the seal unit 10C), and thus, optimum swelling liquids can be selectively used according to the use conditions. In addition, optimum layers can also be selectively used as the coating layers 12 in the seal unit 10B and the seal unit 10C according to the use conditions.

Sixth Embodiment

Figure 7:
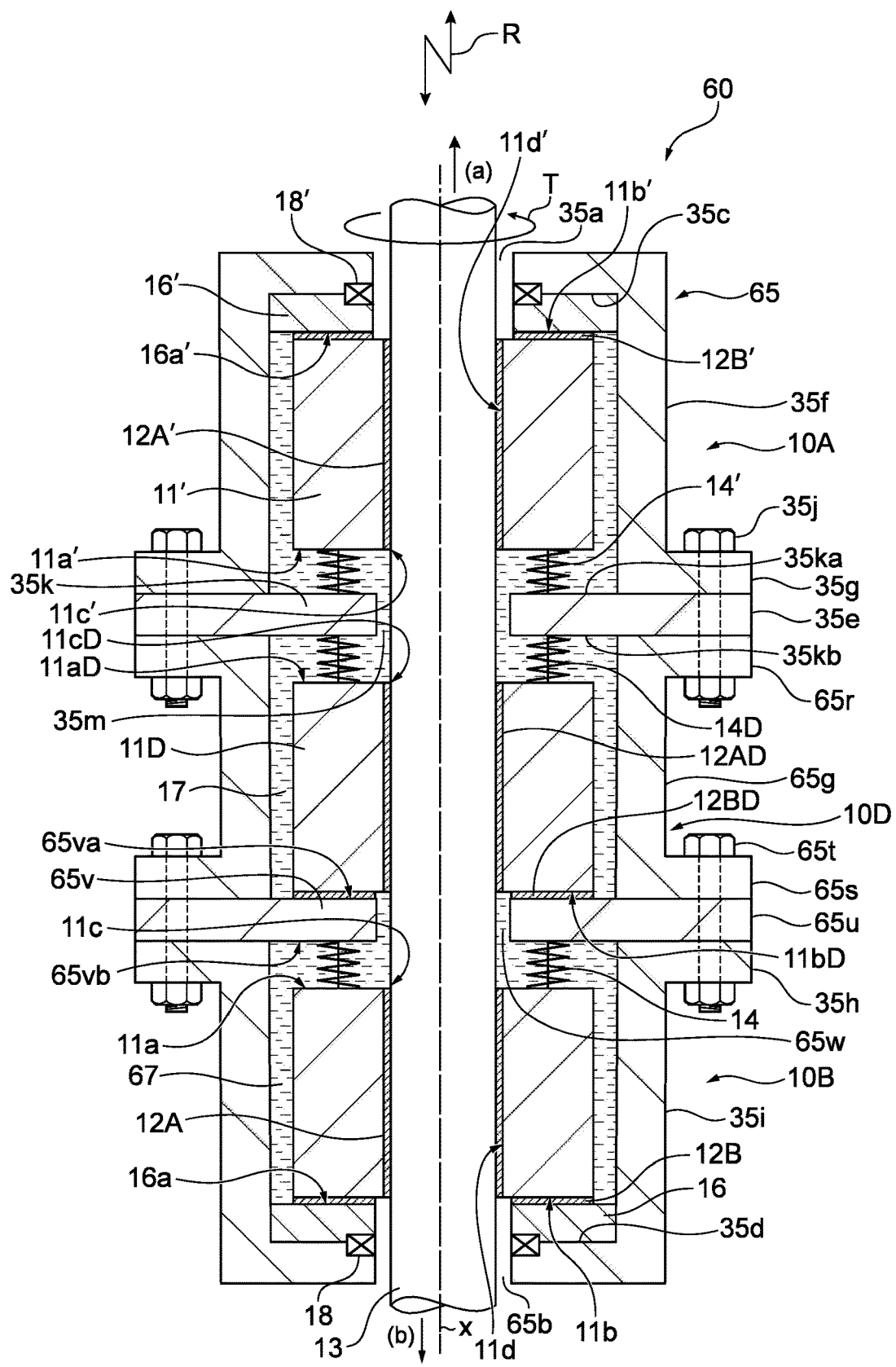
FIG. 7 is a cross-sectional view of a cross-section along an axis for illustrating the schematic configuration of a seal structure according to a sixth embodiment as an exemplary aspect of the present disclosure.

FIG. 7 is a cross-sectional view of a cross-section along the axis x for illustrating the schematic configuration of a seal structure 60 according to a sixth embodiment as an exemplary aspect of the present disclosure. The configuration of the seal structure 60 according to the present embodiment will be described with reference to FIG. 7.

The seal structure 60 according to the sixth embodiment includes three seal units 10A, 10D, and 10B sharing a single housing 65 for a single shaft 13. The three seal units 10A, 10D, and 10B each have a structure substantially similar to that of the seal structure 10 according to the first embodiment (i.e., an aspect of the seal structure of the present disclosure).

The pair of the adjacent seal units 10A and 10D are arranged in a mutually inverted state. Meanwhile, the orientations of another pair of the seal units 10D and 10B are the same along the direction of the axis x.

It should be noted that the seal structure 60 according to the present embodiment is considered as a structure in which the seal unit 10D is sandwiched between the seal unit 10A and the seal unit 10B in the seal structure 30 according to the third embodiment. Accordingly, in FIG. 7 of the present embodiment, members of the seal unit 10A and the seal unit 10B with the same configurations as those of the third embodiment are denoted by the same reference signs as those of the third embodiment, and the detailed description thereof will be omitted.

In addition, members of the seal unit 10D with the same configurations as those of the first embodiment are denoted by the same reference signs as those of the first embodiment with "D" added thereto, and the detailed description thereof will be similarly omitted.

The housing 65 includes a cup member 35f partially forming the seal unit 10A, a cup member 35i partially forming the seal unit 10B, a disk member 35e having an opening 35m for passing the shaft 13 at the center, and members forming the seal unit 10D. The members of the housing 65 forming the seal unit 10D include a cylindrical portion 65g having flange portions 65r and 65s at its opposite ends along the direction of the axis x, and a disk member 65u having an opening 65w for passing the shaft 13 at the center. Such members are sandwiched between the disk member 35e and the cup member 35i.

The flange portion 35h of the cup member 35i among the three members fastened together with the fasteners 35j in the third embodiment is replaced with the flange portion 65r of the cylindrical portion 65g in the present embodiment. That is, in the present embodiment, the flange portion 35g of the cup member 35f and the flange portion 65r of the cylindrical portion 65g are fastened together with the fasteners 35j while sandwiching the disk member 35e therebetween.

In addition, the flange portion 65s of the cylindrical portion 65g and the flange portion 35h of the cup member 35i are fastened together with fasteners 65t each including a vis and a nut, for example, while sandwiching the disk member 65u therebetween.

Through the fastening with the fasteners 35j and the fasteners 65t, a single housing 65 is formed as a whole.

In the present embodiment, springs 14 of the seal unit 10B are provided between a surface 65vb on the lower side (b) of a protruding portion 65v of the disk member 65u, which corresponds to the inner surface region of the housing 65, and an end surface 11a of a bush 11. The springs 14 are connected to the surface 65vb and the end surface 11a.

Springs 14D of the seal unit 10D are provided between a surface 35 kb on the lower side (b) of a protruding portion 35k of the disk member 35e, which corresponds to the inner surface region of the housing 65, and an end surface 11aD of a bush 11D. The springs 14D are connected to the surface 35 kb and the end surface 11aD.

In the present embodiment, there is no member like the ring member 16 between the bush 11D and a surface 65va of the protruding portion 65v of the disk member 65u, which corresponds to the inner surface region of the housing 65, in the seal unit 10D.

Therefore, a facing surface that faces an end surface 11bD of the bush 11D on one side (i.e., the lower side (b)) in the direction of the axis x is the surface 65va, and the housing 65 having the surface 65va forms the pressure-receiving member as referred to in the present disclosure. In addition, a second coating layer 12BD of the seal unit 10D is formed on the surface 65va.

The springs 14D press the bush 11D against the surface 65va of the housing 65 from the other side (i.e., the upper side (a)) in the direction of the axis x. Thus, the end surface 11bD of the bush 11D is pressed against the surface 65va having the second coating layer 12BD formed thereon due to the elastic action (i.e., the restoring action in the extension direction) of the springs 14D.

The internal space of the housing 65 is a hermetically sealed space that allows the region of the seal unit 10A and the region of the seal unit 10D to communicate with each other through the opening 35m. The hermetically sealed space (i.e., the internal space) is filled with a swelling liquid 17 for swelling the first coating layers 12A' and 12AD and the second coating layers 12B' and 12BD in the seal unit 10A and the seal unit 10D.

Meanwhile, in the internal space of the housing 55, the internal space of the region of the seal unit 10B communicates with the side of the seal unit 10D through the opening 65w, but is sealed by the first coating layer 12AD and the second coating layer 12BD in the seal unit 10D on the upper side (a) immediately above it. Therefore, the internal space of the region of the seal unit 10B is separated from the internal space of the region of the seal units 10A and 10D, and thus can be filled with a swelling liquid (i.e., a liquid substance) 67 of a different type from that of the swelling liquid 17 filling the internal space of the region of the seal units 10A and 10D.

In the present embodiment, the seal units 10A, 10D, and 10B each having a configuration substantially similar to that of the first embodiment are provided. Thus, functions and effects similar to those of the first embodiment can be achieved. In the present embodiment, not only the functions and effects similar to those of the first embodiment, but also functions and effects unique to the present embodiment can be expected to be achieved.

That is, in the present embodiment, another seal unit 10B is provided adjacent to one side (i.e., the lower side (b)) of the seal unit 10D along the direction of the axis x. The gap between one side (i.e., the lower side (b)) of the seal unit 10D along the direction of the axis x and the adjacent seal unit 10B is sealed.

Therefore, the swelling liquids 17 and 67 can respectively fill different rooms of the two seal regions, that is, the region of the seal unit 10B and the region of the seal units 10A and 10D, and thus, optimum swelling liquids can be selectively used according to the use conditions. In addition, optimum layers can also be selectively used as the coating layers 12 in the seal unit 10B, the seal unit 10A, and the seal unit 10D according to the use conditions.

In addition, in the present embodiment, each of the region of the seal unit 10B and the region of the seal units 10A and 10D is a hermetically sealed space. That is, although the two rooms in the internal space of the housing 65 are filled with the different swelling liquids 17 and 67, there is no possibility of leakage of the swelling liquids 17 and 67 since each of the two rooms is a hermetically sealed space. Thus, no matter how the seal structure 60 according to the present embodiment is applied such that its top and bottom sides are inclined or tipped over, the sealing effect is not influenced. This can significantly ease the restrictions on the applicable conditions, such as the applicable range, applicable environments, and applicable places.

Further, in the present embodiment, three seal units are arranged successively. Thus, even when leakage has occurred in any of the three seal units, the other seal units can serve as backups. Thus, the durability of the seal structure as a whole significantly improves. In particular, when the seal structure is used under environments of different pressures, for example, when the opposite ends (i.e., the upper side (a) and the lower side (b)) of the seal structure are exposed to greatly different environments or conditions, loads due to such environments or conditions would be applied to the seal units on the opposite ends. Thus, to reduce the load applied to each seal unit, it would be effective to increase the number of seal units.

The effect of improving durability based on such backups is greater when two seal units are provided (as in the third to fifth embodiments) than when one seal unit is provided (as in the first and second embodiments). The effect is even greater when three seal units are provided as in the present embodiment. Needless to say, four or more seal units may be provided as appropriate.

Although six preferred embodiments of the seal structure of the present disclosure have been described above, the seal structure of the present disclosure is not limited to the configurations of the seal structures 10, 20, 30, 40, 50, and 60 according to the aforementioned embodiments. For example, although each of the aforementioned embodiments has illustrated an example in which coiled springs are used as the elastic members and the elastic members for the ring member, the elastic members and the elastic members for the ring member of the present disclosure are not limited to coiled springs, and various elastic bodies, such as leaf springs and rubber, can also be used.

In addition, although each of the aforementioned embodiments has illustrated an example in which the springs 14', 14, 14C, 14D, 24', or 24 are fixed to members on the opposite sides thereof, it is acceptable as long as each of the elastic members and the elastic members for the ring member of the present disclosure has a function of pressing a target member to be pressed (i.e., the bush, ring member, or housing) in a predetermined direction. Further, each of the elastic members and the elastic members for the ring member may be arranged at any position as long as it has such a function. Needless to say, each spring is preferably located between target members to be pressed and fixed to the target members on the opposite sides from the viewpoint of stabilizing the support and pressure.

Further, although each of the aforementioned embodiments has illustrated an example in which the first coating layer 12A is formed on the inner peripheral surface 11d', 11d, 11dC, or 11dD of the shaft hole 11c', 11c, 11cC, or 11cD of the bush 11', 11, 11C, or 11D, it is acceptable as long as the first coating layer of the present disclosure is formed on one or each of the outer peripheral surface of the shaft 13 and the inner peripheral surface 11d', 11d, 11dC, or 11dD of the shaft hole 11c', 11c, 11cC, or 11cD of the bush 11' or 11. As long as the first coating layer is formed between the inner peripheral surface 11d', 11d, 11dC, or 11dD of the shaft hole 11c', 11c, 11cC, or 11cD and the shaft 13, the gap between them can be filled.

Each of the first to fourth embodiments has illustrated an example in which the second coating layer 12B or 12B' is formed on the facing surface 16a', 16a, 26a', or 26a of the ring member 16', 16, 26', or 26. However, in the present disclosure, it is acceptable as long as the second coating layer is formed on one or each of the end surface of the bush 11' or 11 on one side in the direction of the axis x and the facing surface 16a', 16a, 26a', or 26a of the ring member 16', 16, 26', or 26.

Each of the fifth and sixth embodiments has illustrated an example in which the second coating layer 12B, 12BC, or 12BD is formed on each of the facing surface 16a' or 16a of the ring member 16' or 16 and the surface 55ka or 65va that is the inner surface region of the housing 55 or 65.

However, in the present disclosure, it is acceptable as long as the second coating layer is formed on one or each of the end surface of the bush 11', 11, 11C, or 11D on one side in the direction of the axis x and the facing surface 16a' or 16a of the ring member 16' or 16 or the surface 55ka or 65va that is the inner surface region of the housing 55 or 65.

It should be noted that "one side of/along the direction of the axis x" corresponds to the lower side (b) of the seal units 10B and 20B in the first and second embodiments and the third and fourth embodiments, and corresponds to the upper side (a) of the seal units 10A and 20A in the third and fourth embodiments. Likewise, "one side of/along the direction of the axis x" corresponds to the lower side (b) of the seal units 10D and 10B in the fifth and sixth embodiments, and corresponds to the upper side (a) of the seal unit 10A in the sixth embodiment.

Although each embodiment has illustrated an example in which the ring member or the housing (or the inner surface region thereof) forms the pressure-receiving member, the member forming the pressure-receiving member of the present disclosure may be those with other shapes or structures besides the ring member or the housing. In addition, the ring member is not an essential component, and thus, the configuration of each of the first to fourth embodiments may be replaced with the configuration of each of the fifth and sixth embodiments in which a ring member is not provided and the housing forms the pressure-receiving member. Needless to say, even in the fifth and sixth embodiments, the housing may form the pressure-receiving member or a ring member may form the pressure-receiving member in each of the seal units, for example.

For example, in the first embodiment described with reference to FIG. 1, when the inner surface region of the housing forms the facing surface of the pressure-receiving member, the ring member 16 and the seal ring 18 are removed, and thus, the inner surface region 15d of the housing 15 surrounding the opening 15b on one side (i.e., the lower side (b)) in the direction of the axis x corresponds to the "opposed surface of the pressure-receiving member" as referred to in the present disclosure.

In addition, it is acceptable as long as the second coating layer is formed on one or each of the end surface 11b of the bush 11 on one side (i.e., the lower side (b)) in the direction of the axis x and the inner surface region 15d of the housing 15. This is also true of the seal units 10A and 10B of the third embodiment.

Besides, one of ordinary skill in the art can modify the seal structure of the present disclosure as appropriate based on the conventionally known finding. Needless to say, such a modified seal structure is also encompassed by the present disclosure as long as it has the configuration of the present disclosure.

Example

Described hereinafter is a test conducted by actually producing a prototype device with the seal structure of the present disclosure and confirming its sealing performance and durability. It should be noted that the present disclosure is not limited to the configuration of an Example described below.

Figure 8:
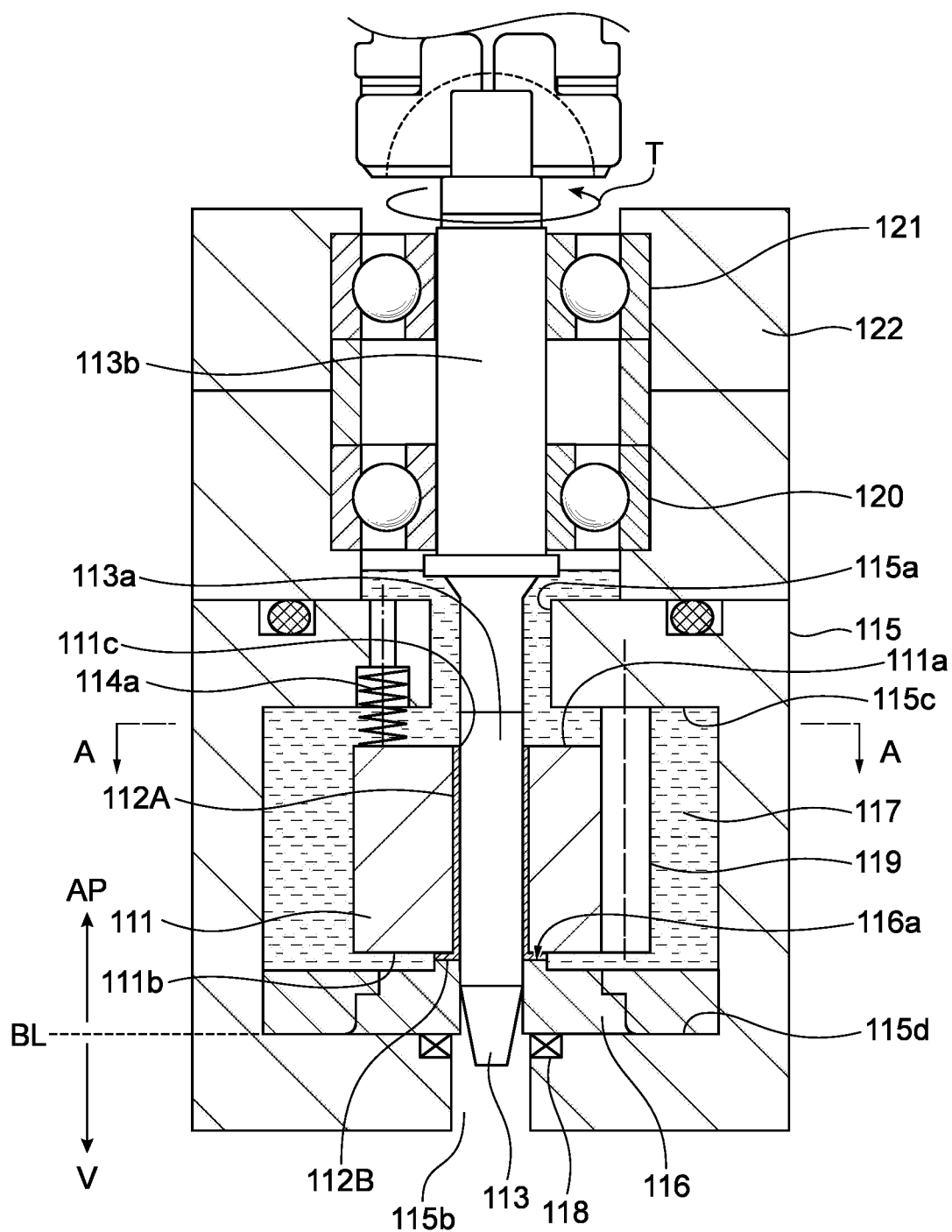
FIG. 8 is a cross-sectional view of a cross-section along an axis for illustrating the schematic configuration of a prototype device produced in an Example.
Figure 9:
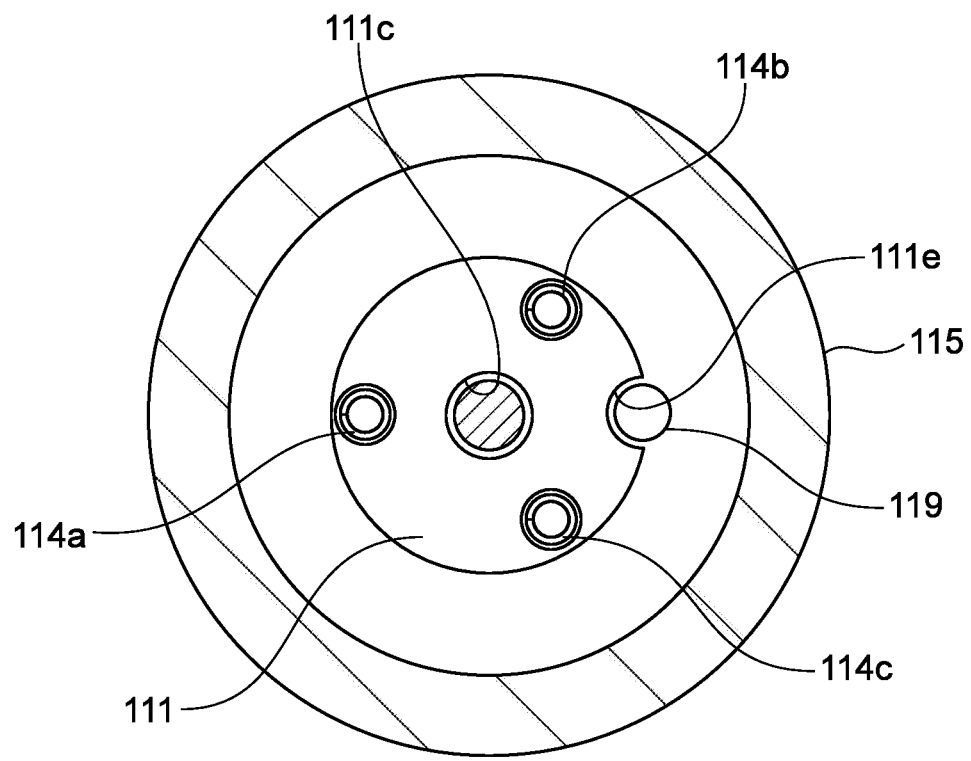
FIG. 9 is an A-A cross-sectional view of FIG. 8 for illustrating the schematic configuration of the prototype device produced in the Example.

FIG. 8 illustrates a cross-sectional view of a cross-section along an axis for illustrating the schematic configuration of a prototype device produced in an Example. FIG. 9 illustrates an A-A cross-sectional view of the prototype device in FIG. 8. It should be noted that in FIG. 9, the illustration of a swelling liquid (i.e., a liquid substance) 117 described below is omitted. It should be also noted that the following description includes a case where the top-down relationship of the prototype device is described based on the top-down relationship in FIG. 8.

The prototype device has a configuration similar to that of the first embodiment illustrated in FIG. 1.

The present prototype device mainly includes, as illustrated in FIGS. 8 and 9, a shaft (i.e., shaft member) 113, a bush 111, a ring member (i.e., a pressure-receiving member) 116, a housing 115, and springs (i.e., elastic members) 114a, 114b, and 114c, a support portion 122, bearings 120 and 121, and a rotary drive device (not illustrated).

The shaft 113 includes a small-diameter portion 113a on the lower side and a large-diameter portion 113b on the upper side.

The housing 115 has openings 115a and 115b, which are adapted to pass the small-diameter portion 113a of the shaft 113, in its opposite end surfaces along the up-down direction.

The bush 111 has the shape of a thick-walled cylinder with a shaft hole 111c through which the shaft 113 is adapted to be fitted and inserted, and has flat ring-shaped end surfaces 111a and 111b on its upper side and lower side. The outer peripheral surface of the bush 111 is provided with an arc-shaped cutout portion 111e extending linearly in the up-down direction.

The ring member 116 is provided between an inner surface region 115d of the housing 115 surrounding the opening 115b and the lower end surface of the bush 111. In addition, the ring member 116 has a facing surface 116a facing the lower end surface of the bush 111.

A seal ring 118 is provided between a region around the central opening of the ring member 116 and the inner surface region 115d of the housing 115.

A first coating layer 112A is formed on the outer peripheral surface of the shaft 113 and the inner peripheral surface of the shaft hole 111c of the bush 111. In addition, a second coating layer 112B is formed on the facing surface 116a of the ring member 116.

The internal space (which is not a hermetically sealed space) of the housing 115 is filled with the swelling liquid 117.

The springs 114a, 114b, and 114c are provided between an inner surface region 115c of the housing 115 surrounding the opening 115a and the upper end surface of the bush 111. The springs 114a, 114b, and 114c press the bush 111 against the ring member 116 from the upper side.

Further, the lower side of each spring 114 along its direction of expansion and contraction is connected to the bush 111, and the upper side of each spring 114 is connected to the inner surface region 115c of the housing 115.

A cylindrical whirl-stop rod 119 extends downward in the vertical direction from the inner surface region 115c of the housing 115. The whirl-stop rod 119 is fitted in the cutout portion 111e of the bush 111, and regulates the movement of the bush 111 in the direction of rotation (i.e., the direction of the arrow T).

The shaft 113 is rotatably supported above the present prototype device as the large-diameter portion 113b of the shaft 113 is fixed to the inner rings of the bearings 120 and 121 whose outer rings are fixed to the support portion 122.

The shaft 113 is configured to rotate counterclockwise (i.e., in the direction of the arrow T) as the upper end of the shaft 113 receives a rotary driving force from the rotary drive device (not illustrated).

In the present prototype device, the housing 115 and its internal structure form the seal structure of the present disclosure.

For such a prototype device, each polymer brush layer was formed under the following conditions.

The dry thickness of each polymer brush layer: the first coating layer 112A (on the outer peripheral surface of the shaft 113): 440 nm, the first coating layer 112A (on the inner peripheral surface of the shaft hole 111c of the bush 111): 1120 nm, and the second coating layer 112B: 460 nm Molecular Structure of Each Polymer Brush Layer:

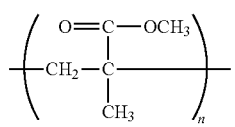

[Formula 1]

The surface occupation rate σ* of the polymer graft chains forming each polymer brush layer:
the first coating layer 112A (on the shaft 113): the graft density σ=0.33
the first coating layer 112A (on the bush 111): the graft density σ=0.33
the second coating layer 112B: the graft density σ=0.31
The average molecular chain length Lp of the polymer graft chains forming each polymer brush layer:
the first coating layer 112A (on the shaft 113): the average molecular chain length Lp=2.4 μm
the first coating layer 112A (on the bush 111): the average molecular chain length Lp=6.1 μm
the second coating layer 112B: the average molecular chain length Lp=2.9 μm
The molecular weight distribution (Mw/Mn) of the polymer graft chains forming each polymer brush layer:
the first coating layer 112A (on the shaft 113): the molecular weight distribution (Mw/Mn)=1.09
the first coating layer 112A (on the bush 111): the molecular weight distribution (Mw/Mn)=1.18
the second coating layer 112B: the molecular weight distribution (Mw/Mn)=1.09

As the swelling liquid 117, an ionic liquid (N-(2-methoxyethyl)-N-methylpyrrolidinium bis(trifluoromethanesulfonyl)imide) (hereinafter abbreviated as "MEMP-TFSI") was used. The member having the polymer brush layer formed thereon was immersed in MEMP-TFSI under a reduced-pressure environment (5000 Pa) for 48 hours to have the polymer brush layer swollen, and was then used for assembling the prototype device.

When the prototype device was assembled, the pressing force of the springs 114 was adjusted by controlling the attached states of the various components so as to allow a load of 20 N to be applied to the facing surface 116a of the ring member 116 from the bush 111.

The upper side of the prototype device was released to be at an atmospheric pressure AP, while the lower side thereof was set to a vacuum state V.

In such a state, the shaft 113 of the prototype device was steadily rotated at 100 rpm (revolutions per minute), and a continuous durability test for about 2000 hours was conducted. Consequently, neither leakage of the swelling liquid 117 from the side of the atmospheric pressure AP to the side of the vacuum state V nor a decrease in the degree of vacuum was confirmed during the durability test. Thus, the sealed state was maintained.

The invention claimed is:

1. A seal structure for sealing a gap between an opening provided in a housing and a shaft member inserted through the opening, comprising:
   a bush provided between the shaft member and the housing and arranged around the shaft member, the bush being tubular and relatively movable with respect to the shaft member in an axial direction and/or a circumferential direction;
   a pressure-receiving member having a facing surface facing an end surface of the bush on one side in the axial direction; and
   an elastic member that presses the bush against the pressure-receiving member from another side in the axial direction,
   wherein:
   a first coating layer is provided between an outer peripheral surface of the shaft member and an inner peripheral surface of a shaft hole of the bush, wherein the inner peripheral surface of the shaft hole is a surface of the bush that is radially closest to the shaft member, the outer peripheral surface of the shaft member comprises a first portion superimposed in a radial direction with the inner peripheral surface of the shaft hole, and at least a part of the first coating layer is provided between the first portion and the inner peripheral surface of the shaft hole, and
   a second coating layer is formed between an end surface of the bush on the one side in the axial direction and the facing surface of the pressure-receiving member, wherein the end surface of the bush on the one side in the axial direction comprises a second portion superimposed in the axial direction with the facing surface of the pressure-receiving member, and at least a part of the second coating layer is provided between the second portion and the facing surface of the pressure-receiving member.

2. The seal structure according to claim 1, wherein the first coating layer and the second coating layer are swollen with a liquid substance.

3. The seal structure according to claim 1, wherein an inner surface region of the housing surrounding the opening forms the facing surface of the pressure-receiving member.

4. The seal structure according to claim 1,
wherein:
a ring member is provided between an inner surface region of the housing surrounding the opening and the end surface of the bush on the one side in the axial direction, the ring member being flat-shaped, and
the ring member forms the pressure-receiving member.

5. The seal structure according to claim 4,
wherein:
an elastic member for the ring member is further provided between the inner surface region of the housing and the ring member, and
the elastic member for the ring member presses the ring member against the bush from the one side in the axial direction.

6. The seal structure according to claim 1, wherein the elastic member is provided between an inner surface region of the housing surrounding, of the opening, the opening on the other side in the axial direction and an end surface of the bush on the other side in the axial direction.

7. The seal structure according to claim 6, wherein one end side of the elastic member along a direction of expansion and contraction is connected to the bush, and another end side of the elastic member is connected to an inner surface of the housing.

8. A seal structure comprising a plurality of seal units arranged in parallel along an axial direction, the seal units each having the seal structure according to claim 1 and sharing the housing for a shaft member.

9. The seal structure according to claim 8, wherein orientations of at least one pair of adjacent seal units among the plurality of seal units are inverted with respect to each other in the axial direction.

10. The seal structure according to claim 9,
wherein:
the housing has a pair of through-holes at opposite positions along the axial direction, the pair of through-holes being adapted to pass the shaft member,
the number of the seal units is two, and
one of the through-holes corresponds to an opening of one of the pair of seal units, and another through-hole corresponds to an opening of another seal unit.

11. The seal structure according to claim 10,
wherein:
the housing includes a protruding portion protruding from an inner peripheral surface of the housing toward the shaft member at a center of the housing along the axial direction, and
in each of the two seal units, the elastic member is provided between a surface of the protruding portion on a side of the seal structure and an end surface of the bush facing the protruding portion.

12. The seal structure according to claim 11, wherein in each of the two seal units, one end side of the elastic member along the direction of expansion and contraction is connected to the bush, and another end side of the elastic member is connected to the protruding portion.

13. The seal structure according to claim 8, wherein orientations of at least one pair of adjacent seal units among the plurality of seal units are the same along the axial direction.

14. The seal structure according to claim 8, further comprising another seal unit adjacent to one side of one of the plurality of seal units along the axial direction.

15. The seal structure according to claim 8, wherein an internal space of the housing is filled with a liquid substance that swells the first coating layer and the second coating layer in each of the plurality of seal units.

* * * * *